(12) United States Patent
Chien et al.

(10) Patent No.: US 9,835,923 B2
(45) Date of Patent: Dec. 5, 2017

(54) BISTABLE LIQUID CRYSTAL LIGHT-MODULATING DEVICE

(71) Applicants: Liang-Chy Chien, Hudson, OH (US); Andrii Varanytsia, Kent, OH (US)

(72) Inventors: Liang-Chy Chien, Hudson, OH (US); Andrii Varanytsia, Kent, OH (US)

(73) Assignee: Kent State University, Kent, OH (US)

( * ) Notice: Subject to any disclaimer, the term of this patent is extended or adjusted under 35 U.S.C. 154(b) by 88 days.

(21) Appl. No.: 14/804,707

(22) Filed: Jul. 21, 2015

(65) Prior Publication Data

US 2016/0018681 A1   Jan. 21, 2016

Related U.S. Application Data

(60) Provisional application No. 62/026,842, filed on Jul. 21, 2014.

(51) Int. Cl.
*G02F 1/13* (2006.01)
*G02F 1/139* (2006.01)
*G02F 1/137* (2006.01)
*G02F 1/1337* (2006.01)

(52) U.S. Cl.
CPC ........ *G02F 1/1391* (2013.01); *G02F 1/13718* (2013.01); *G02F 2001/133742* (2013.01)

(58) Field of Classification Search
CPC ........................ G02F 1/1391; G02F 1/13718
See application file for complete search history.

(56) References Cited

U.S. PATENT DOCUMENTS

| 2008/0198281 A1* | 8/2008 | Klein | C09K 19/52 349/33 |
|---|---|---|---|
| 2013/0258266 A1* | 10/2013 | Sukhomlinova | C09K 19/601 349/179 |

* cited by examiner

*Primary Examiner* — James Dudek
(74) *Attorney, Agent, or Firm* — Renner, Kenner, Greive, Bobak, Taylor & Weber Co. LPA

(57) ABSTRACT

A bistable liquid crystal spatial light modulating (SLM) device (SLM) device utilizes the homeotropic and bubble domain texture change of a cholesteric liquid crystal that is responsive to external stimuli, such as electric voltage, light and pressure. The SLM device is configured to be switched between the two stable textures of the bubble domain texture or the fingerprint texture. In addition, the SLM device may be switched between transparent and light-scattering states by the application of an electric field, light irradiation or physical/mechanical pressure. The light transmission state and the light-scattering states of the present invention are also stable in time at zero voltage, and are reversible upon the application of an external field at a different voltage, frequency or wavelength of light.

10 Claims, 20 Drawing Sheets

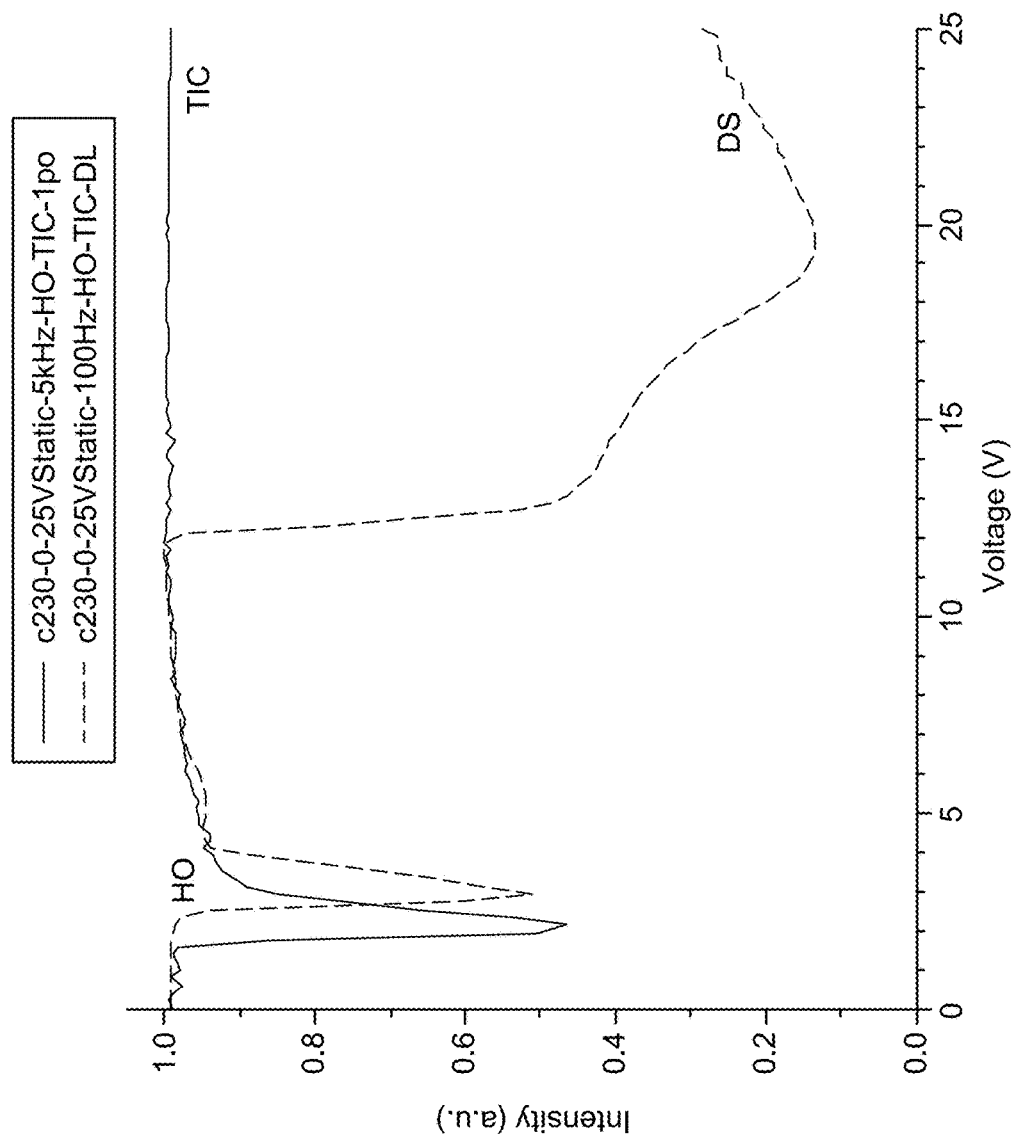

BISTABLE LIQUID CRYSTAL LIGHT-MODULATING DEVICE

CROSS-REFERENCE TO RELATED APPLICATION

This application claims the benefit of U.S. Provisional Application No. 62/026,842 filed Jul. 21, 2014, the contents of which are incorporated herein by reference.

TECHNICAL FIELD

The present invention relates to light-modulating devices. In particular, the present invention relates to a bistable light-modulating device that can be switched between two stable textures. More particularly, the present invention relates to a spatial light modulator (SLM) that can be switched between a plurality of stable optical states upon the application of various external stimuli to the SLM, including electric fields, light irradiation and mechanical force.

BACKGROUND OF THE INVENTION

Cholesteric liquid crystals (CLC) may be prepared from mixtures of cholesterol directives or nematic liquid crystal material, which is combined with one or more chiral dopants. The natural self-assembled helical structure of CLCs enables the cholesteric liquid crystal molecules to twist into a helical structure. For example, cholesteric liquid crystals that are in a ground state have a twisted director field along a helical axis with a periodicity that is characterized by a cholesteric pitch (p) of the CLC at a rotation of the director in 360°. The helical pitch (p) may be tailored to circularly reflect an electromagnetic wave at a preselected wavelength with same optical handedness of the cholesteric liquid crystal. In addition, the cholesteric liquid crystal circularly transmits the other half of the incident electromagnetic wave with the opposite optical handedness.

Cholesteric liquid crystals (CLC) are particularly suitable for use in light modulation devices, or spatial light modulation (SLM) devices, because of their unique polarizer-free optical behavior, which includes optical bistability, color or Bragg reflection, and light-scattering modes/states that are controlled by the electric field-induced change in the liquid crystals. These optical modes/states may be switched back and forth (i.e. reversed) by the application of different external electric fields or different frequencies supplied by a voltage source. In order to observe the field-induced optical effects in cholesteric liquid crystals, the cholesteric liquid crystals are typically sandwiched between two parallel substrates having transparent electrodes deposited on the inside surface of each of the substrates. This configuration allows the electric field or voltage source to be applied across the top-down transparent electrodes. Alternatively, electro-optical cells for in-plane switching of cholesteric liquid crystals (CLC) may be prepared with an interdigitated electrode pattern that is disposed on one substrate and no electrode on the other substrate.

The unique field-induced optical effects produced by the CLCs include, for example, a change in optical states at a switched texture, a change in the switched helical pitch (p), or a change in optical spectra wavelength in response to an applied voltage. These effects depend on both the material properties of the CLCs and the configuration of the spectra light modulating (SLM) device utilizing the CLCs, including the surface treatment used by the SLM, thickness-to-pitch ratio (d/p), the dielectric anisotropy of the nematic host and the particular additives (nanoparticle, quantum dot, dichroic dye, polymer, etc.) used. Cholesteric liquid crystal based spatial light modulating device, which are based on polymer-stabilized cholesteric liquid crystals or polymer-dispersed cholesteric liquid crystals are especially suitable for commercial applications. For example, depending on the surface treatment or boundary conditions of the SLM, the cholesteric liquid crystals used therein may be prepared to have a planar alignment or to have no alignment, so as to reflect a preselected spectral wavelength, as well as be switched to a transparent state, a light-scattering state, or to a state to reflect another wavelength of light.

Another type of spatial light modulating (SLM) device may also be prepared using cholesteric liquid crystals with spherulite textures, whose light modulating effects are controlled based on the size of the gap of the cell used by the SLM device, as well as based on the helical pitch (p) of the CLC and its alignment. With a homeotropic alignment surface treatment and a cell gap (d) that is close or equal to the helical pitch (p), the treated alignment surface of the spatial light modulating device provides weak surface anchoring for the cholesteric liquid crystals, such that the helix deforms to form the spherulite texture. Thus, depending on the frequency of the voltage applied to the SLM device, the SLM device is able to take on a transparent state (in the case of the application of a high-frequency voltage) or an opaque state (in the case of the application of a low-frequency voltage). After the voltage is removed from the SLM device, the SLM device remains in a voltage-induced transparent state or opaque state, whereby the switched optical states are metastable at zero voltage.

In view of the forgoing, there is a need for a bistable liquid crystal spatial light-modulating device that does not require an applied voltage to obtain or maintain one of the following optical states: a transparent state, a light-scattering state or a light-absorbing state. There is also a need for a bistable cholesteric liquid crystal spatial light-modulating device that is based on a homeotropic (HO) and bubble domain (BD) texture change of the cholesteric liquid crystals, which is responsive to external stimuli, such as electric voltage, light irradiation and mechanical pressure or force. In addition, there is a need for a bistable liquid crystal spatial light-modulating (SLM) device that can be utilized in a variety of applications, including, but not limited to, sensors, smart windows, spatial light modulators and displays.

SUMMARY OF THE INVENTION

A light-modulating device of the present invention utilizes cholesteric liquid crystals, which that form homeotropic or bubble domain textures in a cell or tandem structure, whereby a plurality of layers form a device for modulating light of different wavelengths. The light-modulating device of the present invention can be prepared with liquid crystal cells on either a rigid or flexible conductive substrate. The cholesteric light-modulating device of the present invention includes an optical cell where cholesteric liquid crystal material is sandwiched between two indium-tin-oxide (ITO) coated glass electrodes that are separated by either MYLAR or glass bead spacers. Various cell thickness and cholesteric concentrations may be used in order to vary the thickness-to-pitch (d/p) ratio to form the bubble domain texture. A homeotropic alignment of the liquid crystals is obtained by depositing a thin layer of polyimide for vertical alignment or a surfactant on top of the electrodes. With the appropriate cell gap to helical pitch ratio, the formation of an array of uniform cholesteric homeotropic textures spontaneously occurs once the cholesteric mixture is filled into the cell. Applying a low-frequency electric field to the mixture produces the bubble domain (BD) texture, which persists, or remains stable, after the removal of applied voltage. Switching between two stable optical states is achieved by the application of a high-frequency AC (alternating current) electric field, by applying mechanical deformation force, or by applying light irradiation to the modulator of the liquid crystal cell. For example, the light-modulating device may be switched from an initially clear or at least partially transparent state (homeotropic) to an opaque state (bubble domain texture) in response to an applied voltage. This opaque optical state can be reversed by applying a high-frequency voltage pulse so the light modulation device of the present invention takes on a transparent state at zero voltage. In this case, the switched, transparent state is generated and is stable after the removal of the external electric field or applied voltage.

Another embodiment of the light-modulating device of the present invention may be prepared by the addition of a light sensitive moiety to the CLC material, such that the light-modulating device of the present invention is able to be switched from a transparent state to a light-scattering, color-absorbing state or to a dimming state by the application of UV (ultraviolet) light or visible light irradiation. Such photo-induced texture change by the light-modulating device of the present invention is achieved by doping the cholesteric liquid crystals with a light-absorbing moiety, such as azobenzene, dichroic dyes or other suitable chiral dopant. In this case, the light-modulating device of the present invention can be switched between a light-absorbing state to a clear state, or at least partially transparent state, in response to light exposure or an applied electric field. When azobenzene or chiral azobenzene dye molecules are used as the dopants, and are placed under electromagnetic radiation at a preselected wavelength, the azobenzene molecules change from straight-shape molecules (trans-isomer) to bent-shape molecules (cis-isomer). As a result, the cholesteric texture is altered, resulting in a change in the optical state of the optical cell of the present invention. The texture change is due to the change in cholesteric pitch or helical twisting power (HTP) of the chiral dopant. Such optical-induced light modulation is reversible when the light modulator is irradiated with long wavelength light; and the cell is switched back to the initial opaque state.

Another embodiment of the present invention utilizes a light-absorbing dichroic dye to enhance the contrast between initial and switched optical states of the device. When a cholesteric liquid crystal is doped with a light-absorbing dichroic dye, the switched optical state will enhance the light-dimming effect. Doping the cholesteric liquid crystal with both azobenzene and dichroic dyes enables the light-dimming effect to be controlled by light. In case of dichroic dye doping, a vertically-stacked multilayer configuration improves the efficiency of light dimming or creates a new optical modulation mode for full color applications.

Yet another embodiment of the light-modulating device of the present invention may be prepared by adding a small amount of polymer into the cholesteric liquid crystal (CLC) mixture in order to improve the mechanical and optical properties of the opaque state. Polymer that is introduced into the CLC mixture of the device increases the mechanical stability and durability of the opaque state. Introduction of polymer into the CLC mixture of the device also improves self-assembly of the liquid crystal textures in the opaque state, which results in better optical uniformity for diffractive applications.

Another embodiment of the light-modulating device of the present invention is a spatial light modulation device that includes a first conductive, at least partially light transparent electrode; a first homeotropic alignment layer disposed on the first conductive, at least partially light transparent electrode; a second conductive, at least partially light transparent electrode, wherein the first and second electrodes are adapted to be coupled to a voltage source; a second homeotropic alignment layer disposed on the second conductive, at least partially light transparent electrode; a mixture that includes nematic liquid crystal material and a chiral dopant, wherein the mixture is disposed in a gap formed between the first and second alignment layers, such that the first and second alignment layers homeotropically align the liquid crystal material in a stable homeotropic state, wherein the liquid crystal material has a pitch (p) and the gap has a thickness (d), such that $0.5<d/p<1$; wherein, based on the voltage applied, the liquid crystal material changes from the stable homeotropic state to a different state, other than the homeotropic state, which is stable after the voltage is removed from the electrodes.

Yet another embodiment of the light-modulating device of the present invention is a method of modulating light that includes the steps of providing a light modulating device that includes a pair of at least partially light transparent electrodes, such that each electrode has a homeotropic alignment layer disposed thereon, wherein a mixture that includes nematic liquid crystal material and a chiral dopant is disposed in a gap formed between the homeotropic alignment layers, wherein the liquid crystal material has a pitch (p) and the gap has a thickness (d), such that $0.5<d/p<1$; applying a voltage to at least one of the electrodes; changing an optical state of the light modulating device from a homeotropic state to a different state, other than the homeotropic state, in response to the applied voltage; and removing the applied voltage, wherein the different optical state remains stable.

BRIEF DESCRIPTION OF THE DRAWINGS

These and other features and advantages of the present invention will become better understood with regard to the following description, appended claims, and accompanying drawings wherein:

FIG. 6A is a graph of light transmittance versus applied voltage of an optical cell of the present invention when switching from HO to TIC (translationally-invariant-configuration) states in response to an applied voltage of 25 V at 5 kHz between a pair of parallel polarizers in accordance with the concepts of the present invention;

FIGS. 16A-D show the SLM device disposed upon a black background, and FIGS. 16E-H show the SLM device disposed upon a light box, such that FIGS. 16A and 16E show an HO texture at 0V; FIGS. 16B and 16F show a TIC texture after the application of 20V @ 5 kHz from an HO texture; FIGS. 16C and 16G show a DS texture after the application of 20 V @ 100 Hz from an HO texture; and FIGS. 16D and 16H show a BD texture switched from an HO texture in accordance with the concepts of the present invention.

DETAILED DESCRIPTION OF THE INVENTION

Figure 1:
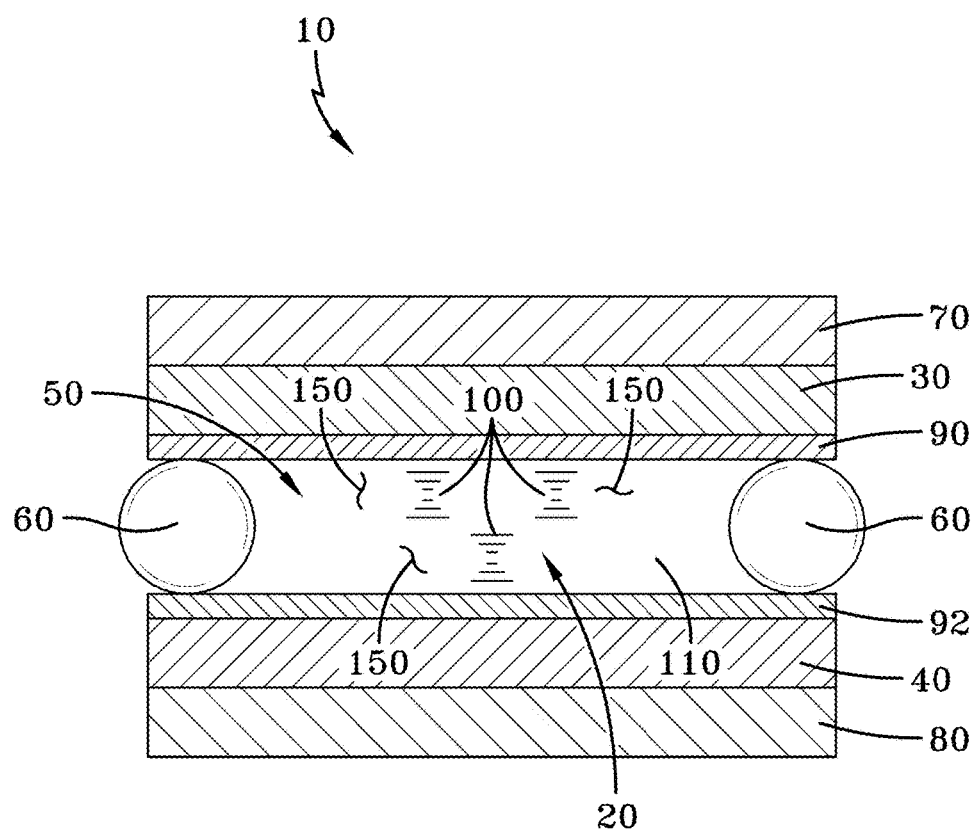
FIG. 1 is a schematic cross-sectional view of a spatial light modulating (SLM) device in accordance with the concepts of the present invention.

A spatial light-modulating (SLM) device of the present invention is generally referred to by numeral 10, as shown in FIG. 1 of the drawings. Specifically, the SLM device 10 includes an optical cell where a cholesteric liquid crystal (CLC) material mixture 20 is sandwiched between two at least partially light transparent electrodes 30 and 40, which may be formed of any suitable material, such as indium-tin-oxide (ITO). The electrodes 30,40 are separated by MYLAR, glass bead spacers 60, or any suitable device, as shown in FIG. 1. It should be appreciated that in some embodiments, the electrodes 30 and 40 may be disposed upon respective at least partially light transparent substrates 70 and 80. In some aspects, the substrates 70,80 may be formed from flexible or rigid material, that is at least partially light transparent. Various cell gap 50 thicknesses and CLC concentrations may be used by the SLM device 10 in order to vary the thickness-to-pitch (d/p) ratio to form the bubble domain (BD) texture. Homeotropic alignment of the CLC mixture 20 in the device 10 is obtained by depositing thin alignment layers 90 and 92, such as polyimide or a surfactant material, on each of the electrodes 30 and 40 to achieve vertical alignment of the CLCs. As such, the alignment layers 90 and 92 are spaced apart by a gap 50, which defines the thickness (d) of the CLC mixture 20 in the SLM device 10, as shown in FIG. 1. With the appropriate cell gap to helical pitch ratio, the formation of an array of uniform cholesteric homeotropic textures spontaneously occurs once the cholesteric mixture is filled into the cell of the device 10. In addition, by connecting a suitable voltage source (not shown) to the electrodes 30 and 40 of the device 10, a low-frequency electric field can be applied to the CLC mixture 20, which produces a bubble domain (BD) texture that persists, so as to be in a stable optical state, after the removal of the applied voltage. Switching between two stable states is achieved by the application of an external stimuli, such as an electric field, such as an high-frequency AC (alternating current) electric field, by applying mechanical deformation force, or by applying light irradiation to the modulator of the liquid crystal cell, which will be discussed in further detail below. Thus, the SLM device 10 of the present invention takes on one stable optical state, which it maintains, until external stimuli is subsequently applied to the SLM device 10, which causes the SLM device 10 to switch into another stable optical state. Furthermore, the SLM device 10 can be successively switched between stable optical states upon the application of external stimuli to the SLM device 10.

In particular, the CLC mixture 20 used by the device 10 includes a mixture of nematic liquid crystals 100 and a chiral dopant 110. In addition, the CLCs are adjusted to form the bubble domain texture, which requires that the CLCs have a helical pitch (p) and that the gap 50 of the device 10 have a thickness (d), whereby a confinement ratio d/p is defined. As such, the confinement ratio is provided, such that $0.5 < d/p < 1$, so as to allow the light scattering bubble domain (BD) texture to exhibit bistability. When the confinement ratio d/p is too small or too large, the BD texture is replaced with a homeotropic (HO) or fingerprint (FP) texture, respectively. For example, if the thickness (d) of the optical cell of the SLM device 10 is smaller than the pitch (p), whereby $d < p$, a transparent off (homeotropic) state can be obtained by the SLM device 10. That is, the anchoring force unwinds the cholesteric helix of the CLCs and aligns the liquid crystal molecules with a uniform homeotropic (HO) texture, while the device is transparent at zero voltage. Alternatively, when the optical cell gap (d) is larger than the pitch (p), whereby $d > p$, the liquid crystal (LC) director is twisted in the bulk of the optical cell, and meets the homeotropic boundary alignment condition near the surface of the substrates, such that a cholesteric fingerprint (FP) texture is formed, whereby the SLM device 10 is permanently opaque. In addition, applying an electric field to the SLM device 10 of the present invention at certain frequencies induces hydrodynamic instability, such that the SLM device 10 is switched from a transparent HO texture to a BD texture, which causes the SLM device 10 to scatter incident light, so as to appear opaque. The light-scattering (opaque) state of the BD texture is maintained an applied voltage of 0/V.

EXAMPLE 1

Electrically-Switchable Bistable Spatial Light Modulator

A cholesteric liquid crystal mixture 20 utilized by the SLM device 10 of the present invention may include nematic liquid crystals (either a positive or negative dielectric anisotropy) and a chiral dopant to form a self-assembled helical structure. A representative cholesteric liquid crystal mixture 20 comprises about 98.46 wt. % of ZLI-4788 ($\Delta\epsilon = -5.7$) (Merck) and about 1.54 wt % of CB15 (HTP=6.3 $\mu m^{-1}$ in ZLI-4788) (Merck). The calculated value of the cholesteric pitch is approximately $p = 10.3\ \mu m$. Liquid crystal cells embodying device 10 were prepared with glass substrates coated with indium-tin-oxide (ITO), which included an alignment layer for homeotropic (HO) alignment. The alignment layers 90,92 were prepared by spin coating a 2% solution of SE1211 polyimide (PI) (Nissan Chemical) on the ITO coated glass substrates for homeotropic liquid crystal alignment by removal of solvent on a hot stage and in an oven. No rubbing was applied to the alignment layer. To induce the bubble domain (BD) texture, a low concentration ion solution in water or alcohol was spin coated on the polyimide, and the substrates were then baked. A representative ionic liquid can be selected from cetyltrimethylammonium bromide (CTAB), 1-butyl-3-methylimidazolium chloride or similar (Sigma-Aldrich) in water. The cell gap was maintained with glass sphere spacers with a nominal thickness of about 7 $\mu m$. In addition, the optical cells of the SLM device 10 were filled with a mixture of cholesteric liquid crystals (CLC) in the isotropic phase in a capillary action and cooled down slowly to a room temperature. The thickness-to-pitch ratio (d/p), or confinement ratio, was controlled, so as to be in the range of about 0.5 to 1.0, where the cholesterics have multiple stable cholesteric textures, including the bubble domain texture, the homeotropic texture or the fingerprint texture.

Samples of the SLM device 10 were tested by viewing the texture of the LC mixture with a polarizing optical microscope (POM), to observe laser diffraction patterns, and with an electro-optical and dielectric apparatus. The experimental setup used for electro-optical measurements included a He:Ne laser (633 nm), a polarizer, an analyzer and a photodiode detector which were all aligned along the optical axis. The transmission axes of the polarizers were kept parallel in order to eliminate undesired noise from the light scattering. The SLM sample device 10 was placed between the polarizer and the analyzer, such that the photodiode detector was configured to detect only the intensity of light at a zero order diffraction maximum.

Figure 2:
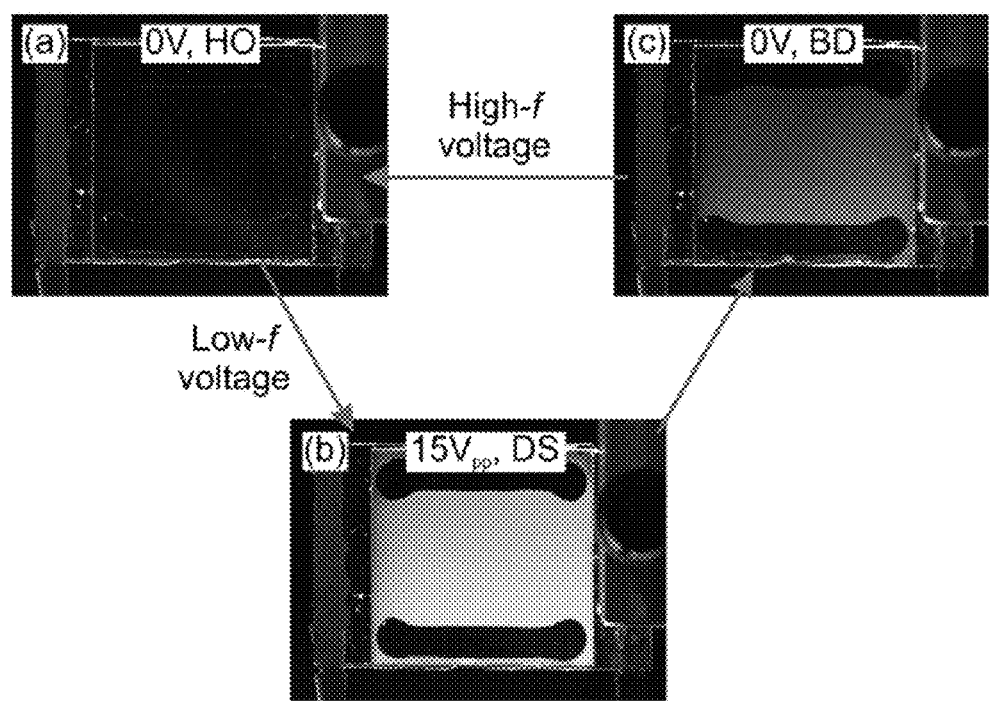
FIG. 2 is a schematic micrograph image of an optical cell of the present invention that is switched between a transparent state [homeotropic (HO) texture] (a.), an active light-scattering state (b.), and a diffractive state [bubble domain (BD) texture] (c.) in accordance with the concepts of the present invention.

The SLM device 10 of the present invention serves as an input transducer for enabling active or bistable processing operations to control light transmission, light scattering or light reflection for example. The stored, or stable, light-scattering state can be switched back to a transparent state by the application of a high-frequency electric field, which recognizes the homeotropic state of the fingerprint state. FIG. 2 shows a CLC cell that is switched between a transparent homeotropic (HO) texture (a.), an active dynamic light-scattering (DS) state (b.), and a bubble domain (BD) texture (c.). When the homeotropic surface alignment layers 90,92 are utilized by the SLM device 10, a bistability in the homeotropic state appears when the optical cell thickness (d) is comparable to the helical pitch (p). In addition, the homeotropic (HO) texture or the fingerprint (FP) texture is maintained without an electric field. A transition from a homeotropic or fingerprint (FP) texture to a bubble domain (BD) texture can be initiated by applying a low-frequency (such as about <100 Hz for example) electric field to the SLM device. Depending on the confinement ratio (d/p), the BD texture can be switched back to the HO or FP textures by applying a high-frequency electric field. The BD texture can be generated by applying a low-frequency electric field with a square wave function or other waveform at a frequency of about 100 Hz and a magnitude of about 15 Vpp (<2 V/µm). The BD texture is stable at around zero voltage and the light-scattering state can be erased by applying a high-frequency electric field with the same wave function, frequency of approximately 5 kHz and magnitude of about 15 Vpp. The SLM device is switched from the transparent state (FIG. 2a), at about zero volts, and to a light-scattering state (FIG. 2b) with a low-frequency electric field of about 15 volts. When the field is turned off, the SLM device is switched and stays at the light-scattering state at around zero voltage (FIG. 2c). In response to a high-frequency voltage of about 15 V, the SLM device is switched to the homeotropic state (FIG. 2a) and stays at the transparent state at around 0 V. For the formation of the bubble domain (BD) texture with an electric field, free ions play an important role in the CLC mixture. The CLC mixture has a small amount of free ions, such that upon increasing the applied voltage, the CLC mixture goes through a transition from a completely unwound HO or FP texture to a translationally invariant configuration (TIC) with a uniform in-plane twist. After the voltage pulse is removed, the CLC returns to its original texture, and no BD texture can be obtained, regardless of the frequency of the applied voltage. The fluctuation of the free ions in the bulk of the optical cell is caused by a low-frequency electric field, which induces local distortions of the LC director field, which creates defects that are stabilized in the form of a cholesteric BD texture after the voltage is removed. In the case of switching from the HO texture to the BD texture directly, the optical contrast between the two states is much more discrete.

Figure 3:
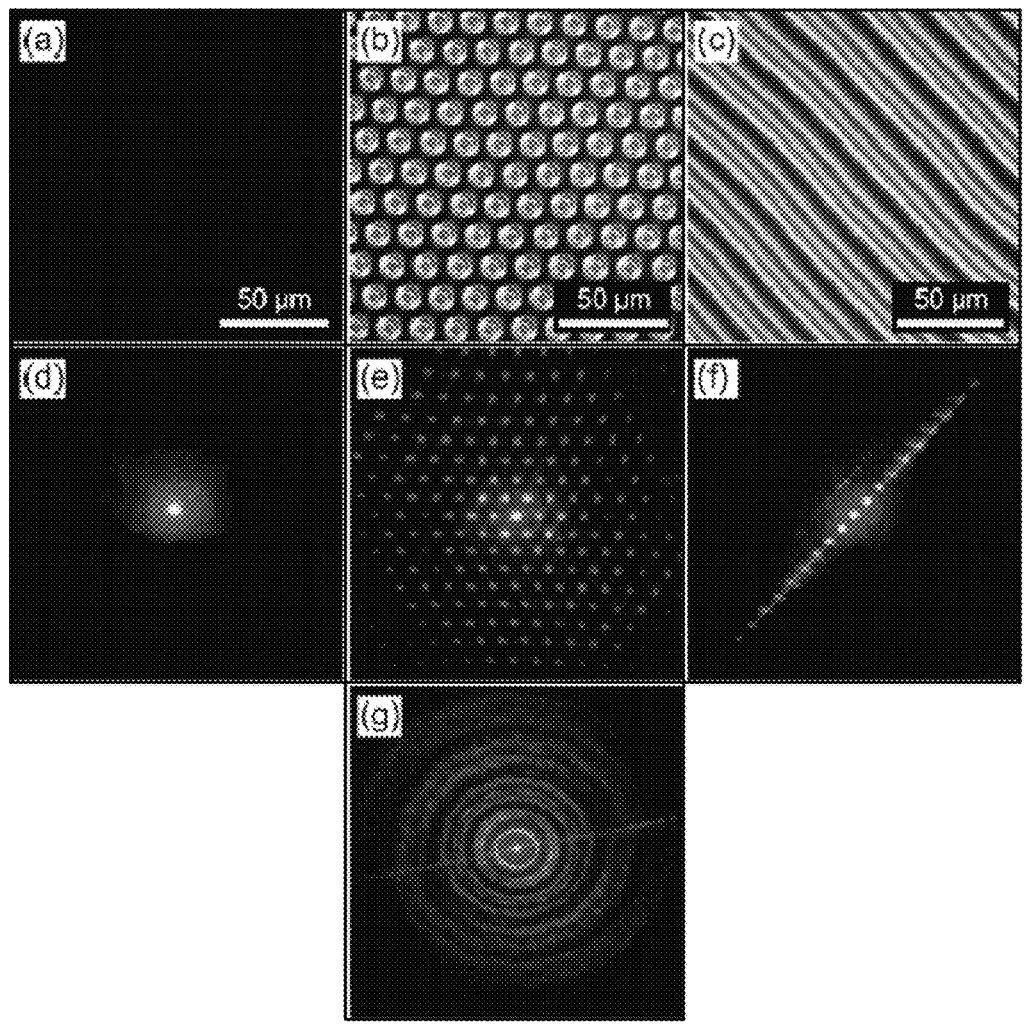
FIG. 3 is a schematic polarized light microscopy (POM) image showing far field diffraction patterns from (a) to (d) for the HO (homeotropic) texture; from (b) to (e) to (g) for the BD (bubble domain) texture; and from (c) to (f) for the FP (fingerprint) texture in accordance with the concepts of the present invention.

For generating and reconfiguring a densely-packed BD texture, it is important to choose the optimal frequency, amplitude, and duration of the switching voltage pulses, helical pitch, and optical cell gap over the helical pitch ratio. FIGS. 3a-f show that the HO, FP, and BD textures can be easily distinguished by analyzing a far-field laser diffraction pattern. The HO texture does not create any diffraction pattern, as shown in FIG. 3d. The BD texture gives a very different diffraction pattern, which includes of a series of concentric diffraction rings with the point of zero order diffraction maximum located in the center, as shown in FIG. 3g. The diffraction pattern forms a well-ordered BD texture that is obtained with a laser beam focused on the sample will include multiple diffraction maxima with an arrangement that corresponds to the ordering of bubbles in the BD texture, as shown in FIG. 3e. In FIG. 3e, the laser beam was focused on the sample with a lens, where the laser beam generates a beam size of less than about 100 µm. The BD texture that was observed is not sensitive to the temperature and was stable for a long time. A stable bubble domain (BD) texture was observed for about six months. The BD texture can be erased by applying pressure or mechanical/physical force to the optical cell. The threshold pressure distorts the LC director, which is sufficient for overcoming the energy barrier between the distance separated point defects that form a cholesteric bubble of the BD. As result, the defects of opposite charges annihilate, and the CLC returns to its original texture. A typical laser diffraction pattern from the FP texture is a diffraction line. If the laser beam is focused on the sample, the diffraction pattern from the FP texture will be in the form of a series of diffraction orders that are aligned along the vector of the cholesteric helix, as show in FIG. 3f.

If the amplitude of the low-frequency voltage pulse is too small, the BD texture will be formed such that the density of the bubbles is small. If the amplitude of the low-frequency voltage pulse is too large, a pattern of single bubbles with defect lines will be formed. This kind of texture provides a weak diffraction pattern, which is similar to the one shown in FIG. 3g, but has a smaller contrast with the HO texture, and is more difficult to detect with a photodiode. In the case when the duration of the applied voltage pulse is too short, the frequency of a low-frequency voltage pulse is too big or the frequency of high-frequency voltage pulse is too small, the transition between two bistable textures will not be completed or will take a longer time.

Figure 4:
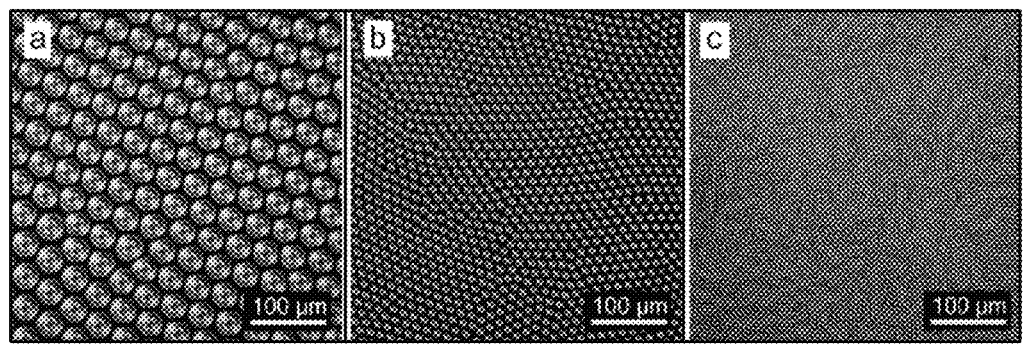
FIG. 4 is a schematic POM image showing densely-packed cholesteric liquid crystal (CLC) bubble domain textures in an optical cell with homeotropic anchoring and a cholesteric pitch of: (a.) 26.5 mm, (b.) 6.5 mm and (c.) 3.2 mm in accordance with the concepts of the present invention.

The size and density of the bubbles in the BD texture can be controlled by changing the thickness (d) of the gap 50, the ratio of film thickness (d) to cholesteric pitch (p), or by increasing an applied voltage. FIGS. 4a-c show polarizing optical microscope (POM) images of densely-packed cholesteric bubble textures in cells with homeotropic anchoring, whereby ratio of the optical cell thickness to cholesteric pitch is approximately 0.77. By changing the film thickness, the size of bubbles in the BD texture is varied from 40 mm (FIG. 3a) to 8 mm (FIG. 3b) and to 4 mm (FIG. 3c) with helical pitch of cholesteric liquid crystals of 26.5 mm, 6.5 mm and 3.2 mm, respectively.

Figure 5A:
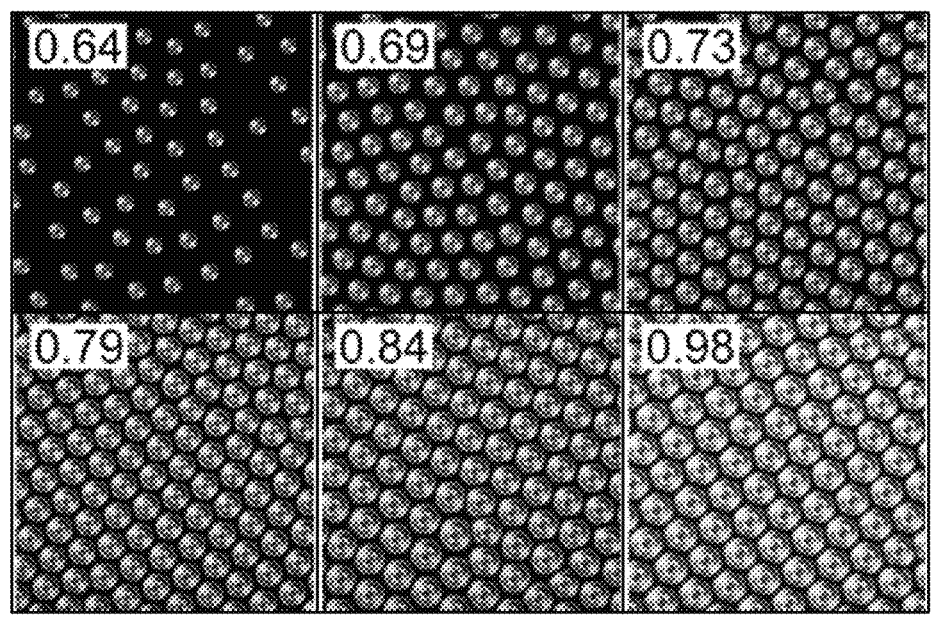
FIG. 5A is a schematic POM image showing the CLC bubble texture density as a function of cell gap and cholesteric pitch ratio in accordance with the concepts of the present invention.
Figure 5B:
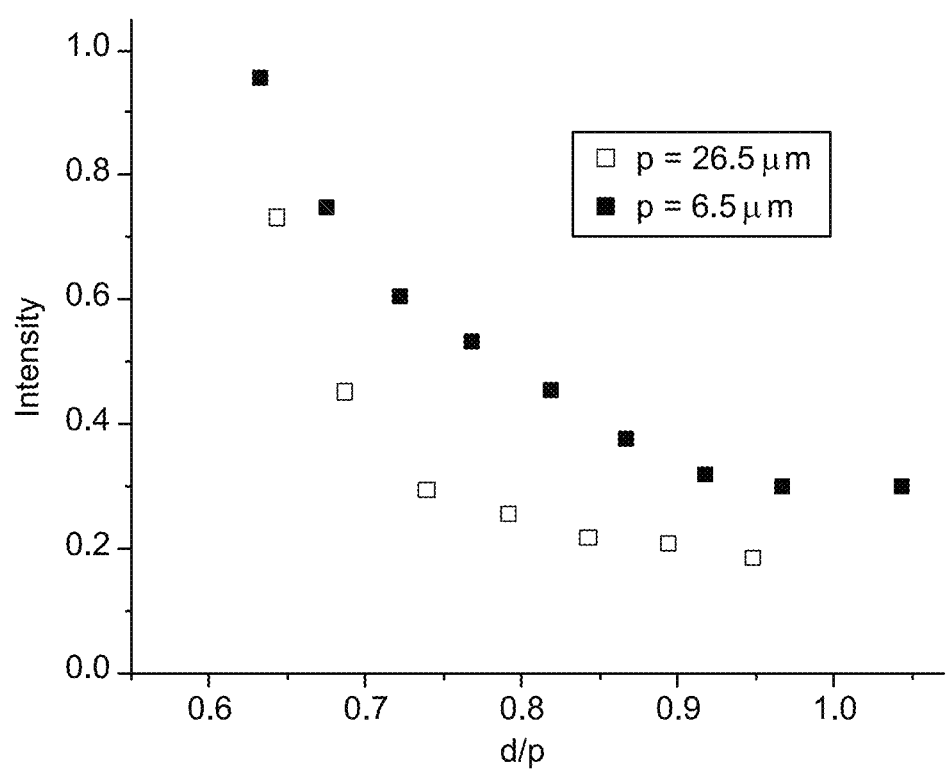
FIG. 5B is a plot of the light transmittance (arbitrary unit) vs. cell gap and cholesteric pitch ratio in accordance with the concepts of the present invention.

Alternatively, once the pitch (p) of the cholesteric liquid crystal is fixed, the appearance and density of bubbles in the BD texture is defined by the film thickness (d) to cholesteric pitch (p) ratio (d/p). FIG. 5A shows the increase in the density of bubbles in the BD texture with the increase of the d/p ratio from 0.64 to 0.98. FIG. 5B shows a plot of light transmittance versus the d/p ratio. As seen from the plot, the curves show the decrease in light transmittance as the d/p ratio is increased, indicating the increase in density of the BD texture in the film or optical cell.

The diffraction efficiency at the desired direction or diffraction maxima ($\eta_n$) of the SLM device can be defined as the ratio of the amount of light ($I_n$) transmitted to the point of n-th order diffraction maxima in the diffractive state over the amount of light ($I_0$) transmitted through the device in a non-diffractive state, as set forth by Eq. (1), as follows:

$\eta_n = I_n / I_0$.

Using Eq. (1), the data that is shown in FIG. 5B can be interpreted as the diffraction efficiency of the zero order diffraction maxima. At low bubble density (d/p ratio ~0.65), the diffraction efficiency of the device 10 is the lowest, and most of the light is transmitted to the zero order diffraction maximum. The diffraction efficiency of the SLM device 10 increases with an increase of the density of bubbles in the BD texture. In this case, light is diffracted to the diffraction maxima of higher orders and less light reaches the zero order diffraction maximum.

Figure 6B:
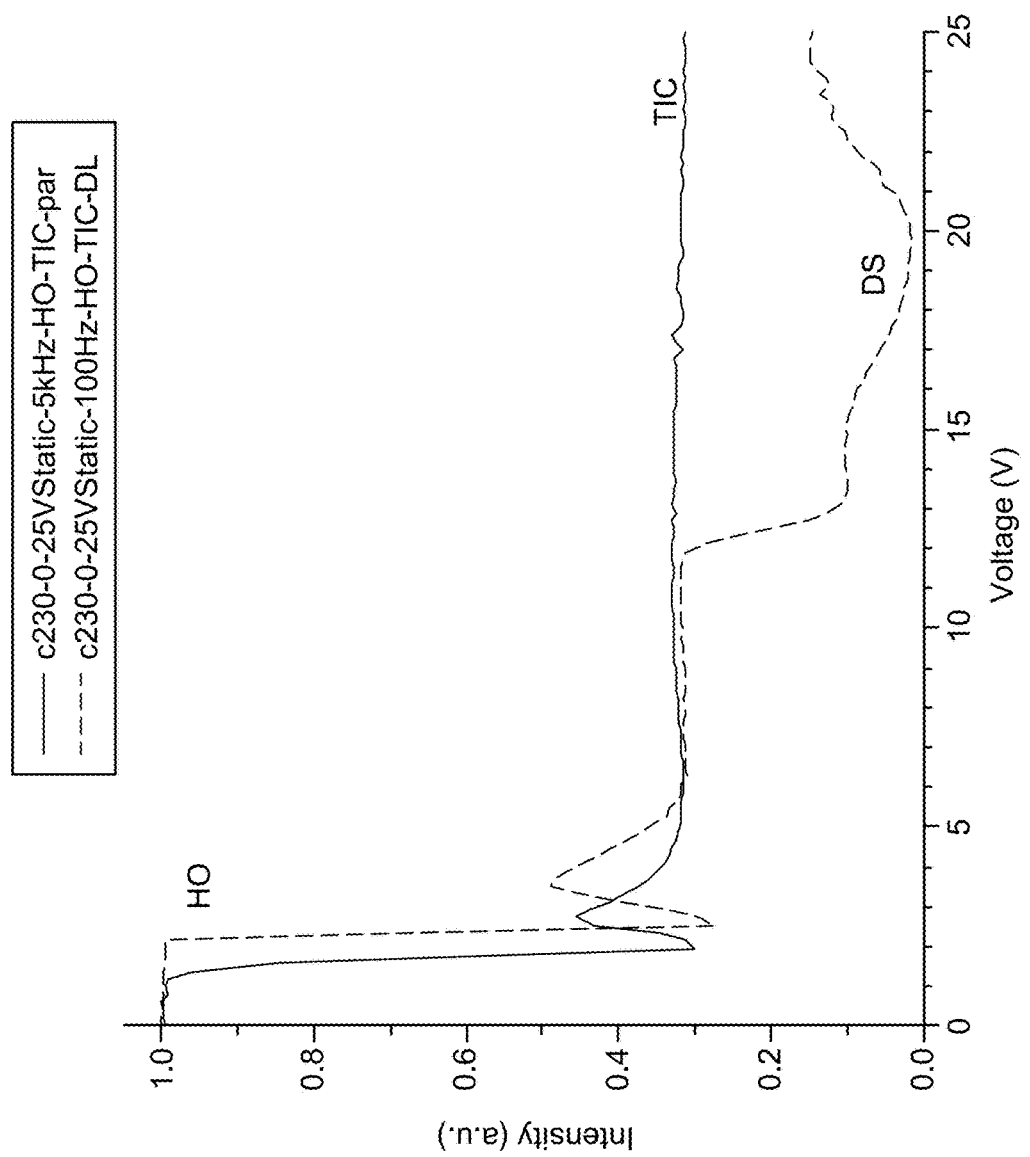
FIG. 6B is a graph of light transmittance versus applied voltage of an optical cell of the present invention when switching from HO to DS states in response to an applied voltage from 0 V to 25 V at 100 Hz between a pair of parallel polarizers in accordance with the concepts of the present invention.
Figure 7:
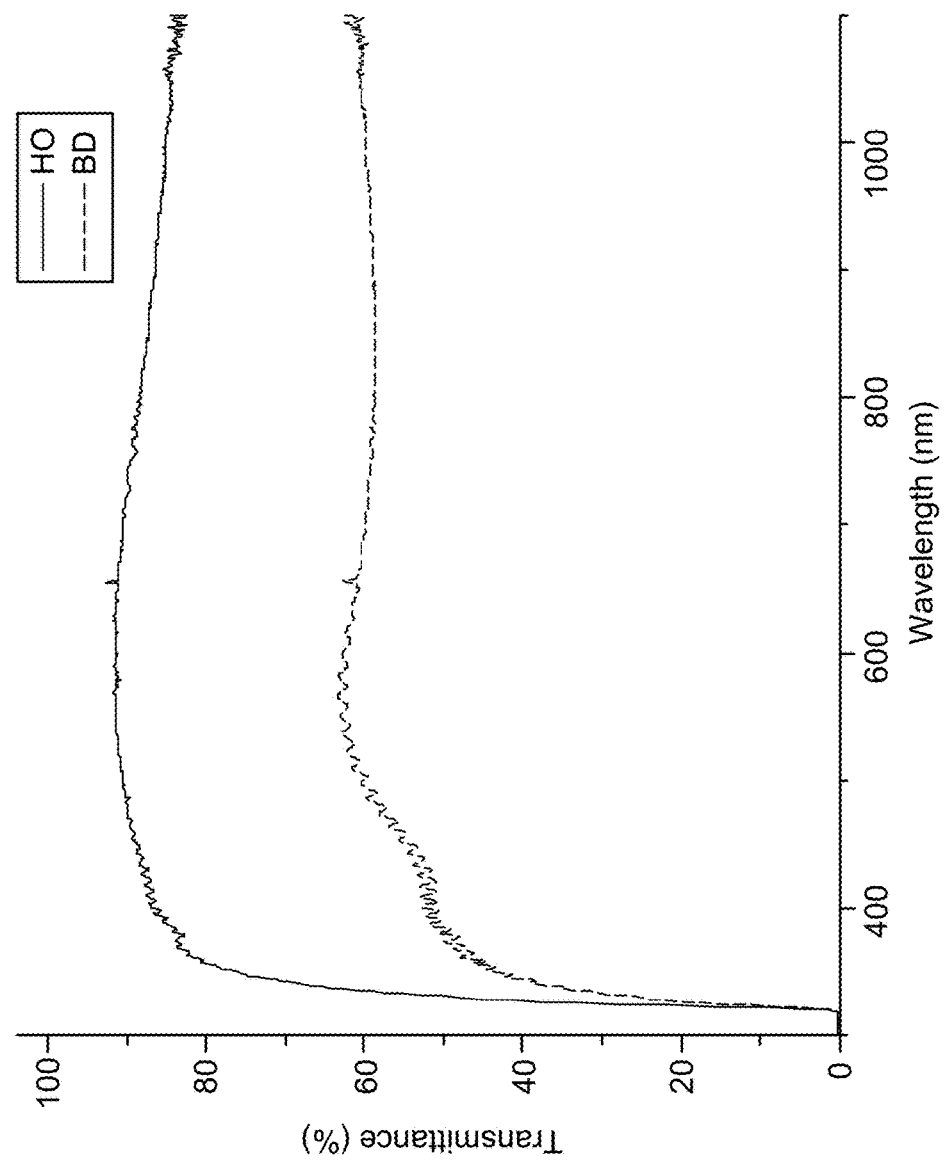
FIG. 7 is a plot of light transmittance versus wavelength of an SLM (spatial light modulation) device at HO and BD states in accordance with the concepts of the present invention.

FIG. 6A shows light transmittance versus applied voltage of an optical cell of the SLM device 10 switching from a homeotropic (HO) state to a translationally-invariant-configuration (TIC) state in response to an applied voltage of up to 25 V at about 5 kHz and switching from an HO state to an active dynamic light-scattering (DS) state from about 0 V to 25 V at approximately 100 Hz without a polarizer. In addition, FIG. 6B shows light transmittance versus applied voltage of an optical cell of the SLM device 10 switching from an HO state to a TIC state in response to an applied voltage of up to 25 V at about 5 kHz, and switching from an HO state to a DS state from about 0 V to 25 V at approximately 100 Hz between a pair of polarizers with transmission axes parallel to each other. To switch between the HO and the BD textures, a voltage pulse with steep slopes may be applied. In the case of a slow decrease in the amplitude of the low-frequency voltage, the BD texture with small density of bubbles is formed. When the amplitude of the high-frequency voltage is slowly decreased, a non-stable FP texture will appear and slowly be replaced with a uniform homeotropic texture. It may take up to one minute or longer for the non-stable FP texture to disappear. The SLM device 10 of the present invention is capable of modulating light transmittance from the UV (ultraviolet) to the IR (infrared) spectrum. FIG. 6 shows the intensity of transmitted light through the SLM device 10 as a function of the wavelength. For an SLM device 10 with a cell gap of about 7 µm, the average light transmittance is around 85% when moving from the UV (ultraviolet) wavelength to the near IR (infrared) wavelength for the SLM device 10 at homeotropic texture at zero voltage. The average light transmittance for the SLM device 10 in the BD state is about 50% to 60% when moving from the UV spectra to the near IR spectra. The efficiency of light modulation can be further improved by increasing the optical cell gap 50 or density of the BD texture of the SLM device 10.

Figure 8A:
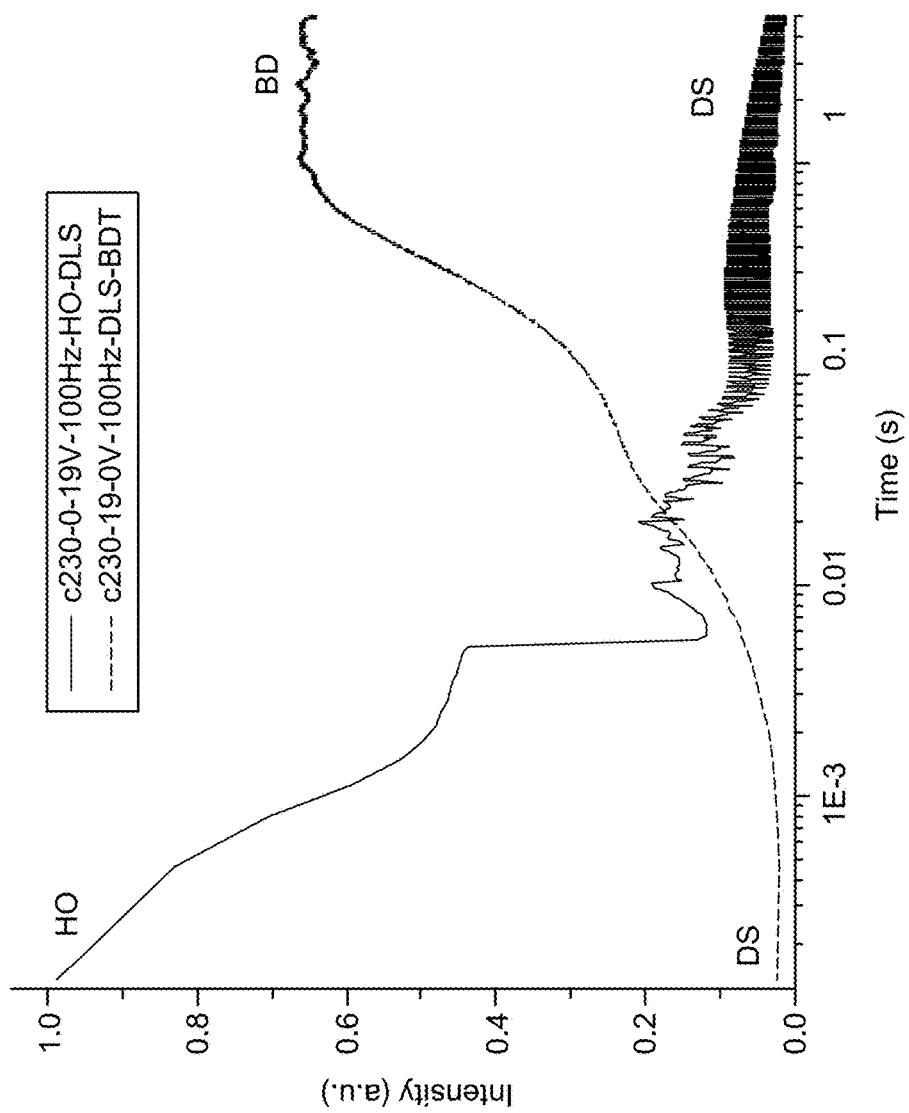
FIG. 8A is a plot of light transmittance versus time of an optical cell of the present invention when switching from an HO state to an active DS state in response to an applied voltage of 19V at 100 Hz, and switching to a BD state at 0 V after voltage is removed between a pair of parallel polarizers in accordance with the concepts of the present invention.
Figure 8B:
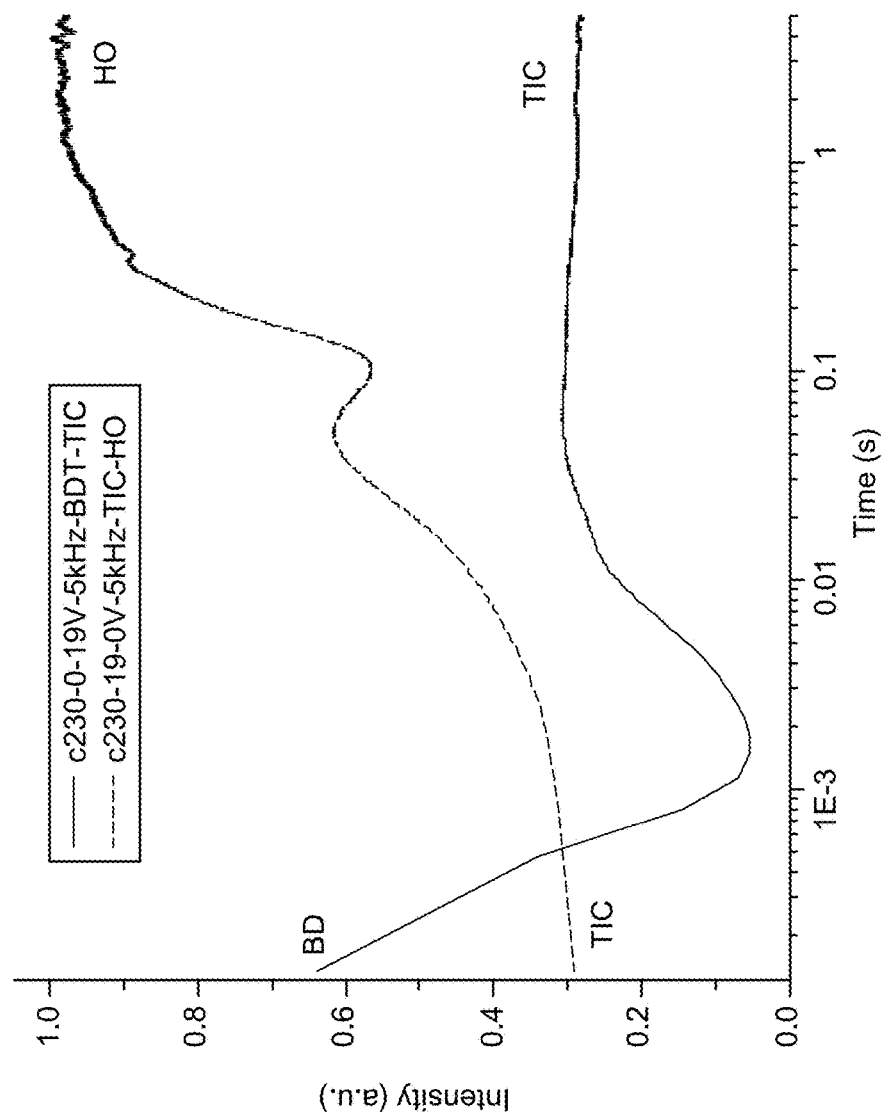
FIG. 8B is a plot of light transmittance versus time of an optical cell of the present invention when switching from a BD state to a TIC state in response to an applied voltage of 19 V at 5 kHz, and switching from a TIC state to an HO state at 0 V after voltage is removed between a pair of parallel polarizers in accordance with the concepts of the present invention.

The dynamic response of the SLM device 10 of the present invention is evaluated with the light intensity of transmitted zero order diffraction maxima through the SLM sample as a function of applied voltage. FIGS. 8A-B show the intensity of transmitted light as a function of time after the switching voltage pulse of a low or high frequency was applied or removed. The term "Response time", as used herein, is defined as the amount of time that it takes for the CLC material to transform from an original equilibrium state to the state when detector voltage reaches a saturated level, within 10% of either value. After the voltage pulse is removed, the CLC material returns back to an equilibrium state with a characteristic time, referred to as "equilibrium time", which is defined as the equilibrium time from the moment when the voltage pulse was removed, until the detected light intensity reaches the saturated level, within 10% of either value. To switch between the two bistable textures, the voltage pulse has to be applied for a time not shorter than the response time. The switching will be completed over the total switching time, which is a sum of the response and equilibrium time. The response time of a low-frequency voltage when switched from the homeotropic texture to the dynamic light-scattering state is approximately 0.020 seconds. The equilibrium time after the low-frequency voltage is removed and the material is switched to the BD texture is approximately 0.665 seconds. When switching from the BD texture to the TIC state with a high-frequency voltage, the response time is approximately 0.045 seconds. The equilibrium time from the TIC to the HO texture after the high-frequency voltage is removed is about 2.100 seconds.

The SLM device 10 of the present invention can also be used to modulate light transmittance in response to a mechanical/physical stress force. For example, the light-scattering state of the SLM device can be switched by mechanical stress, such as a physical touch, which switches the bubble domain (BD) texture to the transparent state of the homeotropic (HO) texture. The BD texture is not sensitive to temperature and is able to remain stable for many months. The BD texture can be erased by the application of pressure to the optical cell. The threshold pressure distorts the liquid crystal (LC) director, which is sufficient for overcoming the energy barrier between the distance separated point defects, which form a cholesteric bubble. As a result, the defects of opposite charges annihilate, and the CLC returns to its original texture. As such, the phenomenon of voltage-controlled bistability between the BD and the HO or the FP textures and the sensitivity of the BD texture to the mechanical distortion of the LC director field for detection of a pressure is provided by the SLM device 10 of the present invention. The signal from such detector can be read by analyzing the intensity of light transmitted through an LC cell at the point of zero order diffraction maximum of a laser diffraction pattern. The homeotropic texture does not create any diffraction pattern, and the maximum amount of light is transmitted through the optical cell. In the case of the BD texture, some light is consumed by diffraction maxima of other orders and the intensity of the light transmitted through the cell to the point of zero order diffraction maximum is smaller than in the case of the homeotropic texture.

Figure 9:
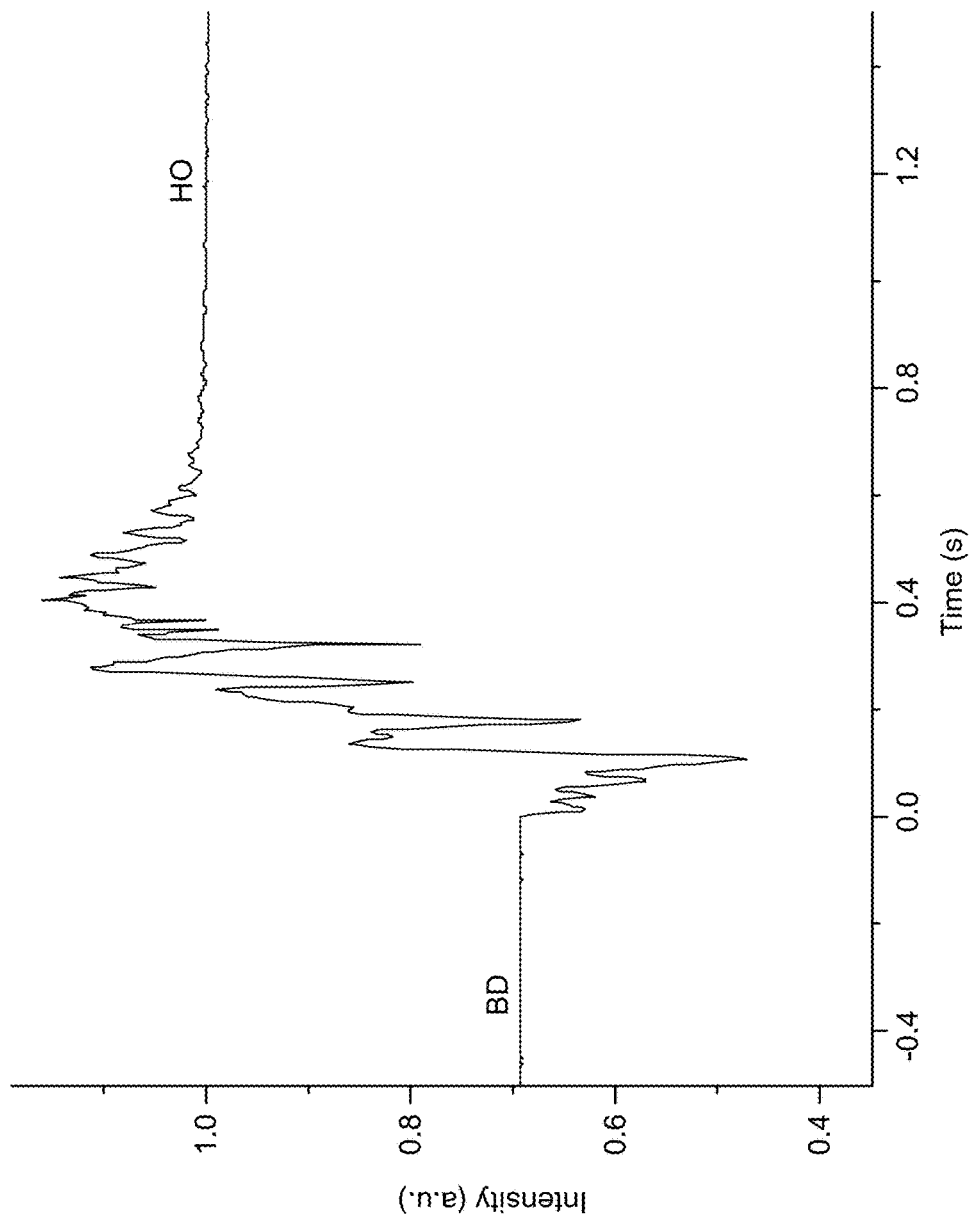
FIG. 9 is a graph showing the mechanical force-induced change in the transmitted light intensity that is detected at a diffraction maxima of zero order during switching from the bubble domain (BD) texture to the homeotropic (HO) texture that is caused by the application of pressure of about 2.1e+5 Pa in accordance with the concepts of the present invention.

FIG. 9 shows the change of light intensity at zero order diffraction maximum in response to applied critical pressure as a function of time. Furthermore, the data shown in FIG. 9 was obtained by monitoring the intensity of the light while gradually increasing the load applied to the glass of the optical cell. The force from the load on the optical cell was transmitted through a small ring with a contact area of about 1.4e-5 $m^2$. The ring with the load was placed in the middle of the cell and the laser beam for detection of a diffraction pattern was guided through the center of the ring. When the threshold pressure is applied, the BD texture switches to an HO texture which corresponds to a change of intensity of light detected by a photodiode detector. In FIG. 9, the threshold pressure was applied at the zero moment of time, and the BD texture was replaced with the HO texture over the equilibrium time of approximately 0.450 seconds. For the tested samples, switching occurred when the optical cell was loaded with a mass of about 300 g, which corresponds to a pressure of about 2.1e+5 Pa. It should be appreciated that test optical cells were made of rigid glass substrates. The sensitivity threshold will significantly depend on the design of the LC (liquid crystal) cell and the manner in which force is applied to the cell. In particular, the sensitivity threshold is expected to be smaller in the cells made of thinner glass, plastic substrates, or substrates of a bigger size, etc. In one aspect, a pressure-sensitive liquid crystalline light-modulating device and material is described in U.S. Pat. Nos. 6,104,448 and 7,351,506, which are incorporated herein by reference, such that the polymer is distributed in an appropriate amount that stabilizes the structure of the modulator and whereby a mechanical stress is applied to a polymer and cholesteric liquid crystalline composite film.

Figure 10:
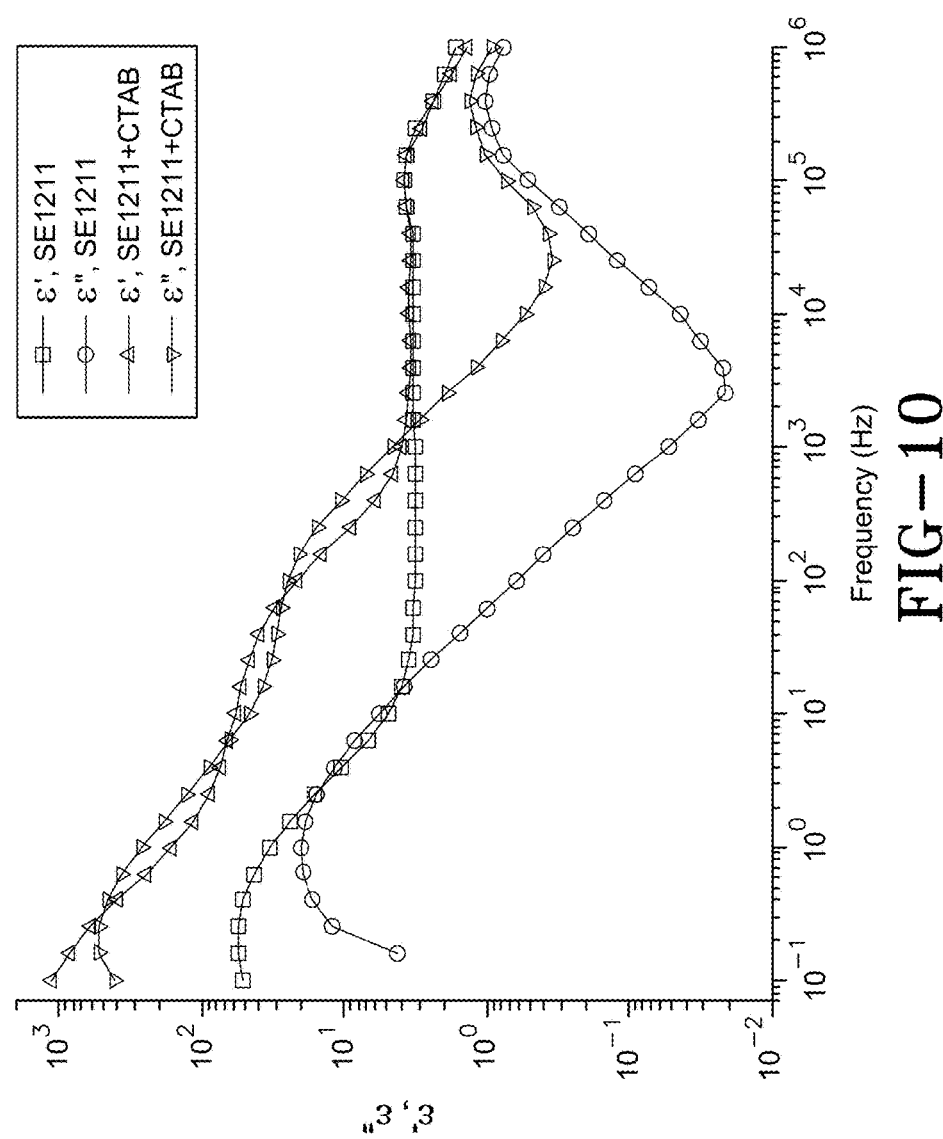
FIG. 10 is a graph showing the complex dielectric permittivity parts of a CLC mixture in the spatial light modulator (SLM) device of the present invention with and without ions of CTAB as a function of frequency.

The switching of the CLC upon the application of an applied voltage is changed with an introduction of free ions into the CLC mixture from the ionic component of the alignment layer. When voltage is applied, the CLC mixture with a high concentration of free ions will switch to an active dynamic light-scattering (DS) state, and after the voltage pulse is removed, the BD texture will be formed. To confirm this observation, a dielectric evaluation was performed by capacitance measurements using a SI-1260 impedance/gain-phase analyzer (Schlumberger). FIG. 10 shows the dielectric measurements, whereby the CLC mixture in an optical cell with ions at low frequencies has a significantly bigger complex dielectric permittivity than the CLC mixture in an optical cell without ions. High dielectric permittivity at low frequencies of the CTAB sample can be explained by the presence of a significant amount of free ions in the bulk of CLC.

Mechanical and optical properties of the SLM device of the present invention can be improved by introducing a small amount of polymer 150 into the mixture 20. Polymer is obtained during the UV (ultraviolet) light-induced polymerization reaction (for instance, illumination with UV light with the wavelength of about 365 nm and intensity 45 mW/cm$^2$ for 10 minutes) of a reactive mesogen, such as RM257 or other with similar properties, in the presence of a small amount of photoinitiator, such as Irgacure 651 (Ciba) or other with similar properties, or without photoinitiator. The role of the photoinitiator is to increase the absorbance of the UV light. The photoinitiator can be used in an amount in the range of about 0 wt. % to 1 wt. % and is adjusted to the concentration of the reactive monomer. In order to increase the mechanical stability and durability of the light-scattering textures of the SLM device the amount of the reactive monomer can be up to about 10 wt. % or more, depending on the desired properties of the final device.

Furthermore, monomer introduced into the CLC mixture promotes better self-assembly of the liquid crystal textures in the opaque state, as compared to CLC mixtures that do not include the monomer. CLC mixtures with monomer produce uniform domains of a bigger size, which provides better optical uniformity for the diffractive applications.

EXAMPLE 2

Light-Switchable Bistable Spatial Light Modulator

Liquid crystal displays currently on the market are mainly based on optical switching that is controlled by an electric field. Optically-switchable spatial light modulators (OS-SLM) have many applications, such as in real-time holographic displays and active diffractive elements; as well as in optical phase conjugation, and intensity dimming and amplification. High-performance OSSLMs may be fabricated with azobenzene dye-doped cholesteric liquid crystals for use in a wide range of applications in switchable light shutters, smart windows, projection displays and large area LCD devices, for example. Photochemical switching using azobenzene-doped liquid crystals has been reported with potential application in both display and photonic devices. Azobenzene-doped nematic liquid crystals for photo-induced phase transitions enable the selective light exposure initiates in either a trans-to-cis or cis-to-trans isomerization of the azobenzene molecules and induces the liquid crystals to the isotropic phase change.

Figure 11:
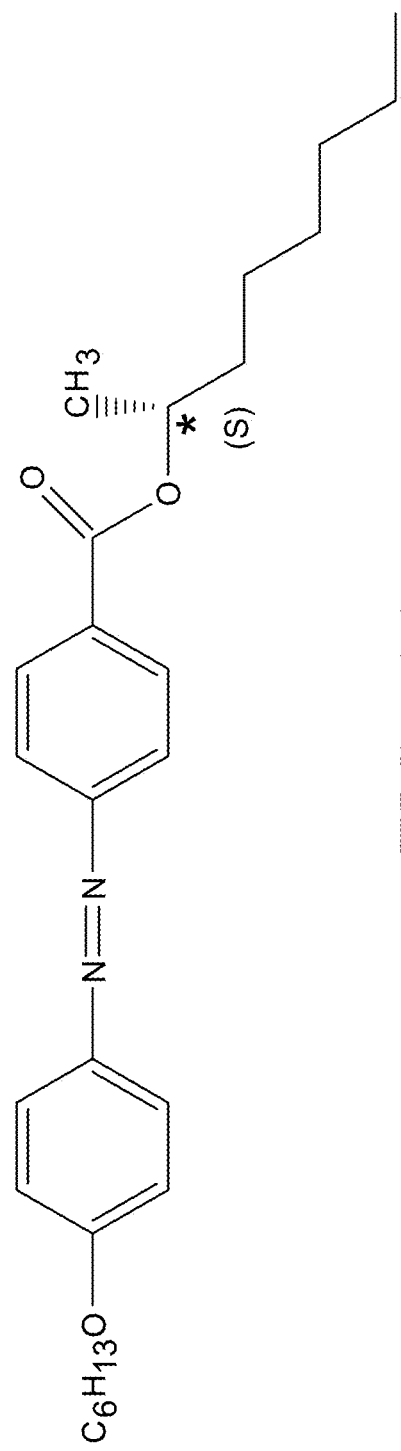
FIG. 11 is a schematic view of a chiral azobenzene dye molecule utilized by the SLM device in accordance with the concepts of the present invention.
Figure 12:
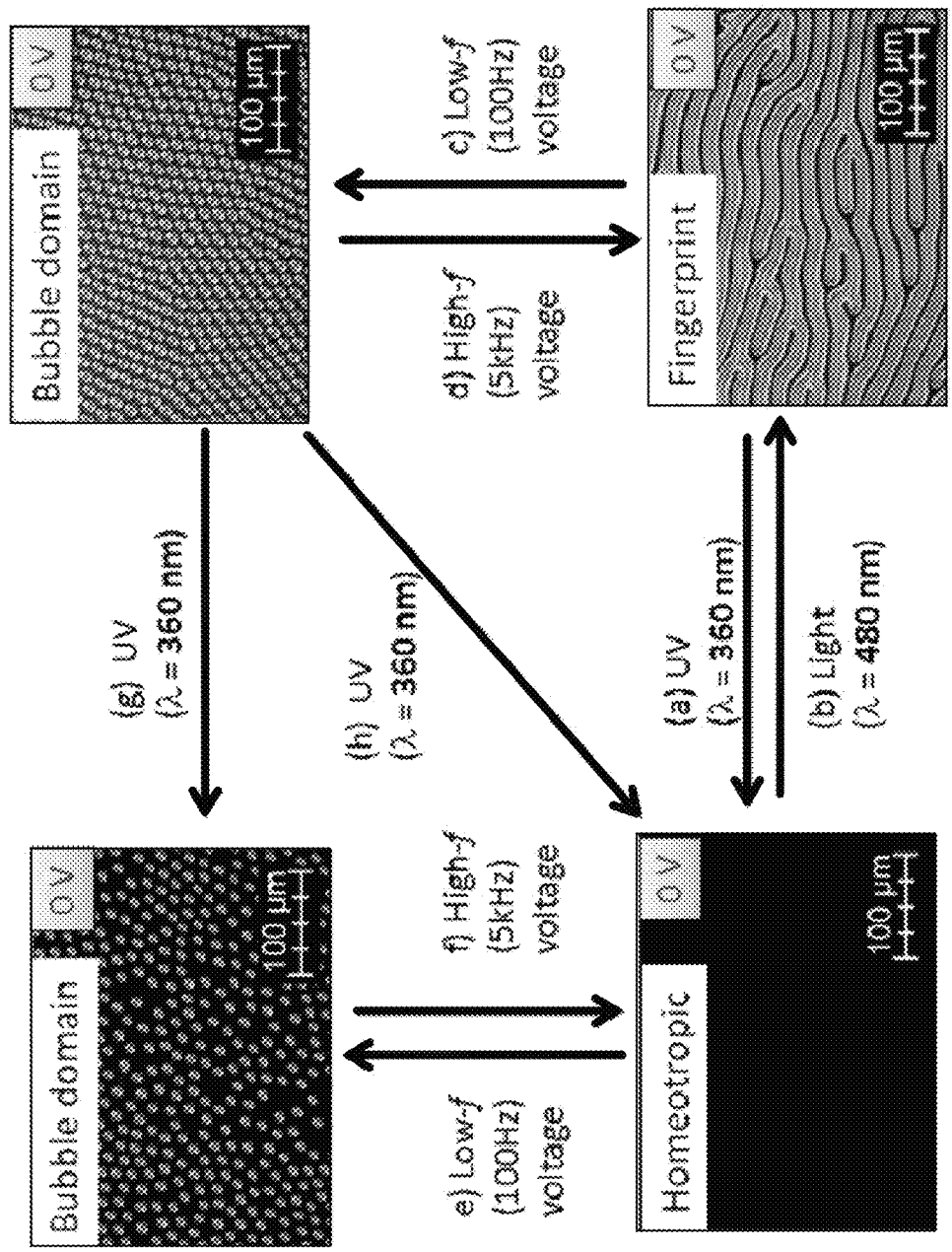
FIG. 12 is a schematic micrograph view of a photo-induced and electrically-switched spatial light modulator (SLM) device of the present invention, whereby an azobenzene-doped cholesteric liquid crystal undergoes an ultraviolet (UV) illumination-induced FP to HO texture change (a.), a visible illumination-induced HO to an FP texture change (b.), a low-frequency (100 Hz) electric-field-induced FP to BD texture change (c.), a high-frequency (5 kHz) electric-field-induced BD to FP texture change (d.), a low-frequency (100 Hz) electric-field-induced HO to BD texture change (e.), a high-frequency (5 kHz) electric-field-induced BD to HO texture change (f.), a UV (ultraviolet) illumination-induced denser BD to less dense BD texture change (g.), and a UV illumination-induced BD to HO texture change (h.) in accordance with the concepts of the present invention.

FIG. 11 shows a chiral azobenzene dye used to dope the cholesteric bubble domain based SLM device 10, which can be prepared by mixing a dichrotic dye, such as azobenzene dye, with cholesteric liquid crystal at the concentration of about 0.1%~10.0% and more favorably at the concentration of between about 0.1% and 5%. With the device 10 having a d/p ratio between about 0.5 and 1.0, and having homeotropic alignment, the SLM device 10 is transparent in an optical cell with the azobenzene dye-doped cholesteric with a HO texture state at 0 volts. The light transmission state is dimmed and transformed to a light absorption state in response to an applied electric field and transfers the cholesteric liquid crystals (CLC) into the bubble domain (BD) texture. Light absorption is increased as the dye concentration or film thickness is increased, or when a small amount of dichroic or photochromic dye is added into the CLC. The LC in the BD texture state aligns the dichroic dye molecules, which absorbs the incoming light in all incident angles. The SLM device 10 remains in a stable the light-absorbing state after removal of the applied voltage. The dichroic dye-doped SLM device containing a dye concentration that is increased from about 1% to 3% can achieve about 50% to 80% light dimming in response to a UV exposure or to an applied voltage.

Selective light modulation or texture change can be achieved by photo-induced conformation change in azobenzene or chiral azobenzene moiety with a selected wavelength of light illumination. The light-induced phase change leads to pitch dilation of azobenzene-doped CLC when the chiral dopant shows a change in helical twisting power (HTP) (decrease or increase) under ultraviolet or visible light illumination. A trans-cis conversion can be achieved by LED (light-emitting diode) UV irradiation having an approximate wavelength $\lambda$=365 nm (110 mW/cm$^2$ for about 1.5 s) and cis-trans conversion with an air-cooled Argon ion laser having an approximate wavelength $\lambda$=480 nm (400 mW/cm$^2$ for about 8.0 s) or higher wavelength depending on the constituents of the azobenzene compound. An OSSLM modulator is prepared by doping the above mentioned BD texture (with d/p ratio being adjusted between 0.6-0.9) with 1.3% of a chiral azobenzene as shown FIG. 11.

The cholesteric-based SLM devices containing a light-sensitive additive with the above mentioned interchangeable cholesteric textures are promising for all optical shutters, sensor and optical data-storage applications. FIGS. 12a-h show the SLM device 10 of the present invention being photo-switched and electrically-switched, whereby the SLM device 10 has an initial ground state of a homeotropic or bubble domain texture. When exposing the SLM device at the FP texture at zero voltage to UV illumination, the SLM device is switched from an opaque FP state to a transparent HO state, following path (a) in FIG. 12, and stays transparent at 0 volts. The SLM device is switched from an HO to FP texture in response to a visible light exposure, as shown in path (b), and stays in this state when 0 volts are applied. The FP texture can be electrically switched to the dense BD texture with a low-frequency bias voltage following path (c) and stays in this state at 0 voltage. The BD texture can be switched back to the FP texture with a high-frequency bias voltage following path (d) and stays at this state at 0 voltage. In the same way, the HO texture can be switched to a BD texture with a lower bubble density, following path (e), and stays at this state at 0 voltage, and can be switched back to an HO texture with a high-frequency voltage, following path (f). The dense BD texture in response to UV illumination can be switched to the less dense BD texture, following path (g), or to the HO texture, following path (h), and stays in that state with 0 voltage.

Figure 13A:
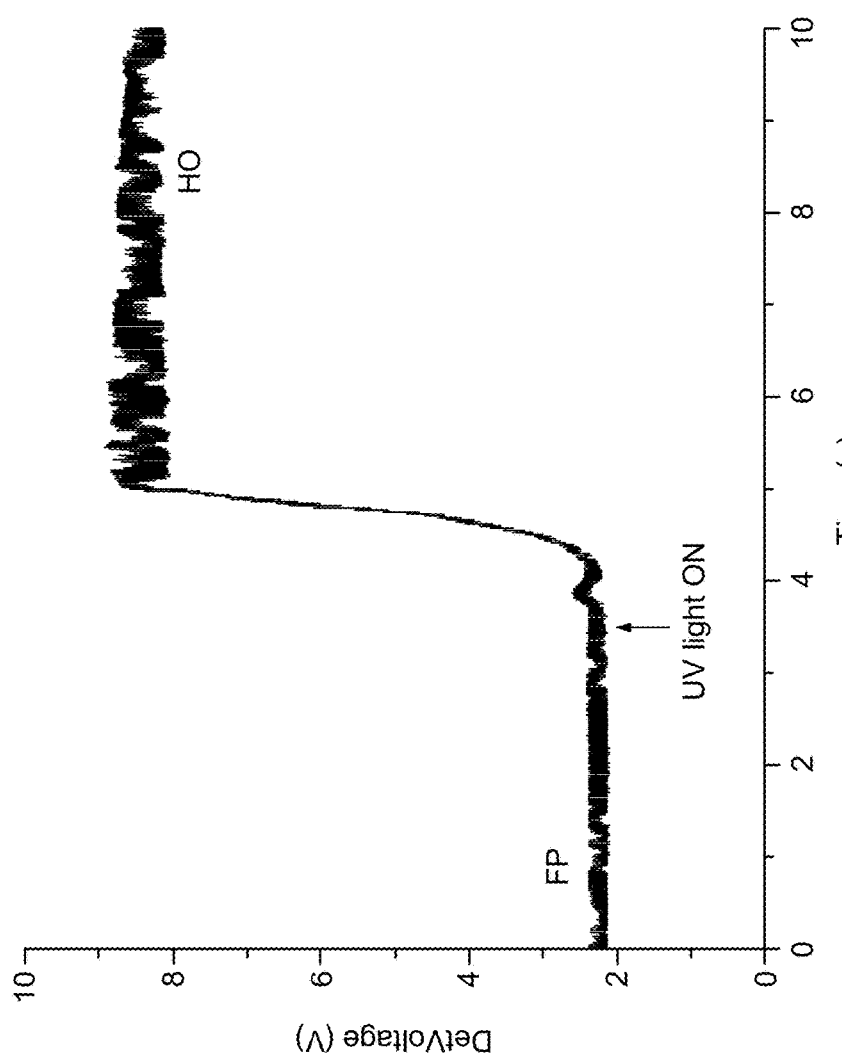
FIG. 13A is a graph showing the light transmittance switching times for the SLM device of the present invention from an opaque (FP) state to a transparent (HO) state upon sequential photo-irradiation of the SLM device with UV (ultraviolet) and visible light sources, respectively, in accordance with the concepts of the present invention.
Figure 13B:
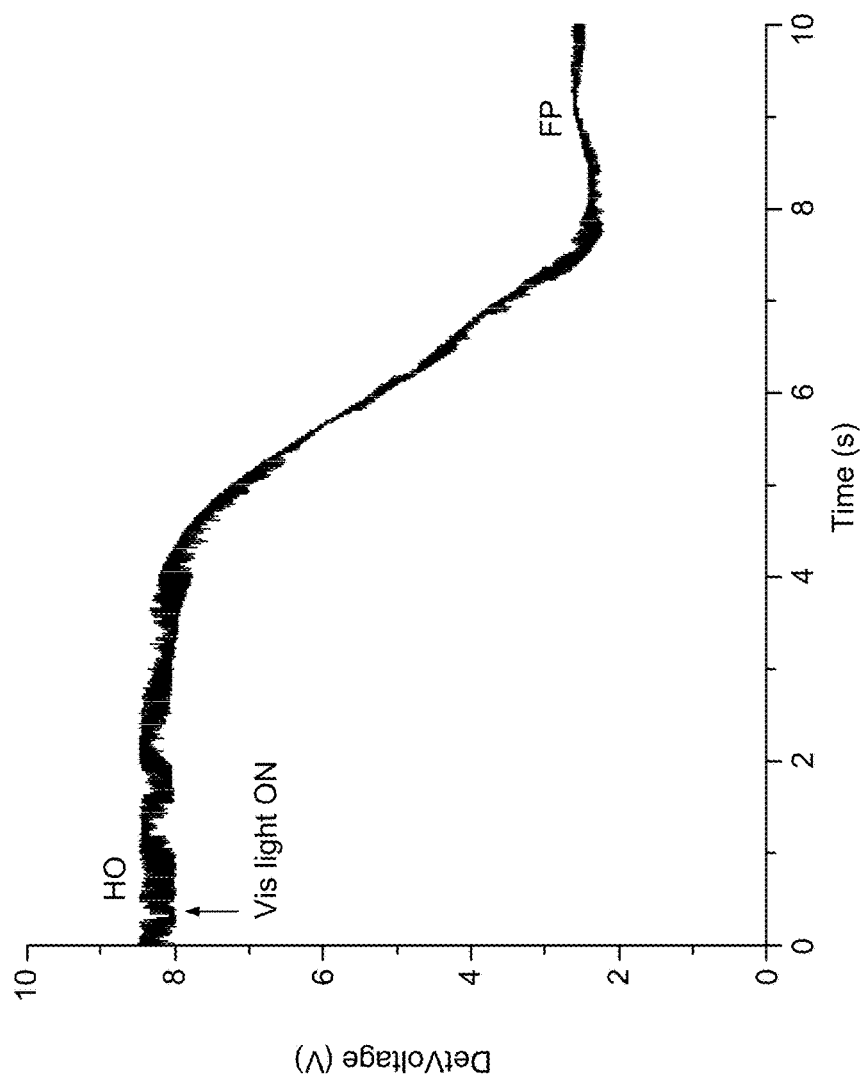
FIG. 13B is a graph showing the light transmittance switching times of the SLM device of the present invention from a transparent (HO) state to an opaque (FP) state upon sequential photo-irradiation of the SLM device with UV (ultraviolet) and visible light sources, respectively, in accordance with the concepts of the present invention
Figure 13C:
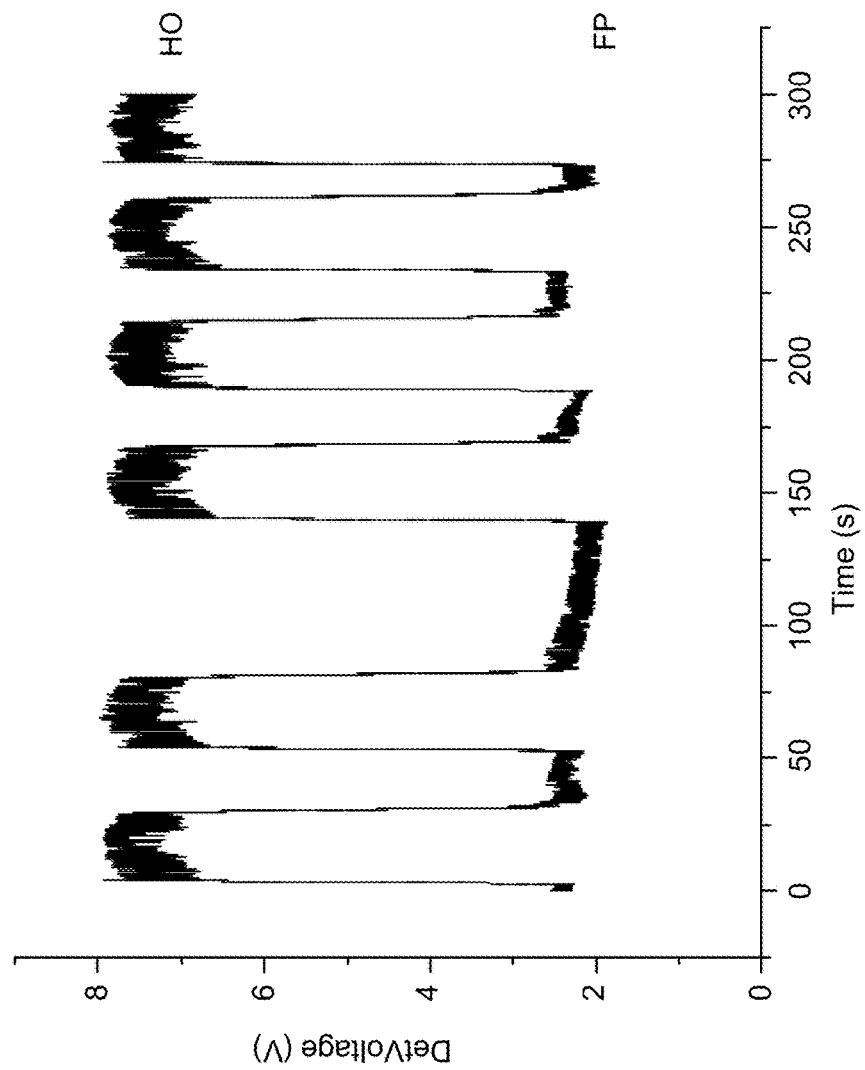
FIG. 13C is a graph showing the light transmittance switching times of the SLM device of the present invention between FP and HO states upon sequential photo-irradiation of the SLM device with UV (ultraviolet) and visible light sources, respectively, in accordance with the concepts of the present invention.

An example of the dynamics of photo-induced texture change of an azobenzene-doped SLM device is shown in FIGS. 13A-C. The response time of photo-induced switching between the FP and HO texture is about 600 milliseconds, as shown in FIG. 13A. By contrast, the reversal of photo-induced switching between the HO and FP textures takes about four seconds to complete, as shown in FIG. 13B. This phenomenon may be due to the low energy input of the visible light source. A continuous change in light transmittance on a sequential photo-irradiation of the SLM device with UV and visible light sources is shown in FIG. 13C, respectively. As seen from the results of continuous photo-irradiation with two different light sources, the divergence in amplitude of light transmittance changed between the HO and FP textures is negligible.

According to FIGS. 13A-C, the optical contrast between the relaxed states of the HO and the BD textures is high, while the electrically switched BD texture and the FP texture display a gray scale of optical contrast between the relaxed BD and HO states.

Figure 14:
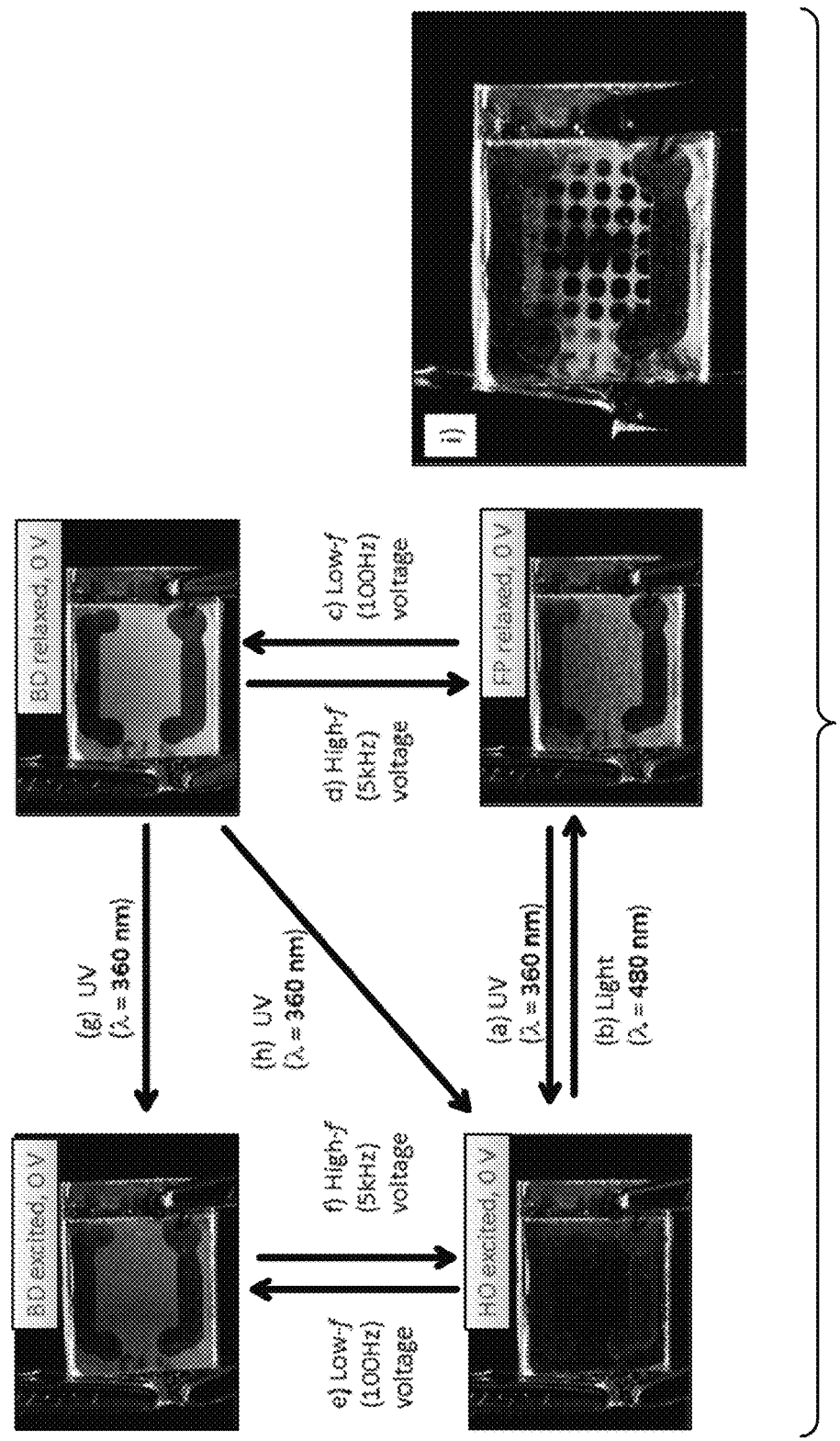
FIG. 14 is a schematic micrograph view of the SLM device of the present invention undergoing photo-induced and electrically-switched cholesteric textures showing a UV illumination-induced FP to HO texture change (a.), a visible illumination-induced HO to FP texture change (b.), a low-frequency (100 Hz) electric-field-induced FP to BD texture change (c.), a high-frequency (5 kHz) electric-field-induced BD to FP texture change (d.), a low-frequency (100 Hz) electric-field-induced HO to BD texture change (e.), a high-frequency (5 kHz) electric-field-induced BD to HO texture change (f.), a UV illumination-induced FP denser BD to less dense BD texture change (g.), a UV illumination-induced BD to HO texture change (h.), and a photo of the SLM device irradiated with UV light through a mask showing the bistability of two photo-switched states (i.) in accordance with the concepts of the present invention.

The corresponding photos of the SLM device at different light-modulating states are shown in FIG. 14.

EXAMPLE 3

Dye-Doped Light-Dimming Devices

Figure 15A:
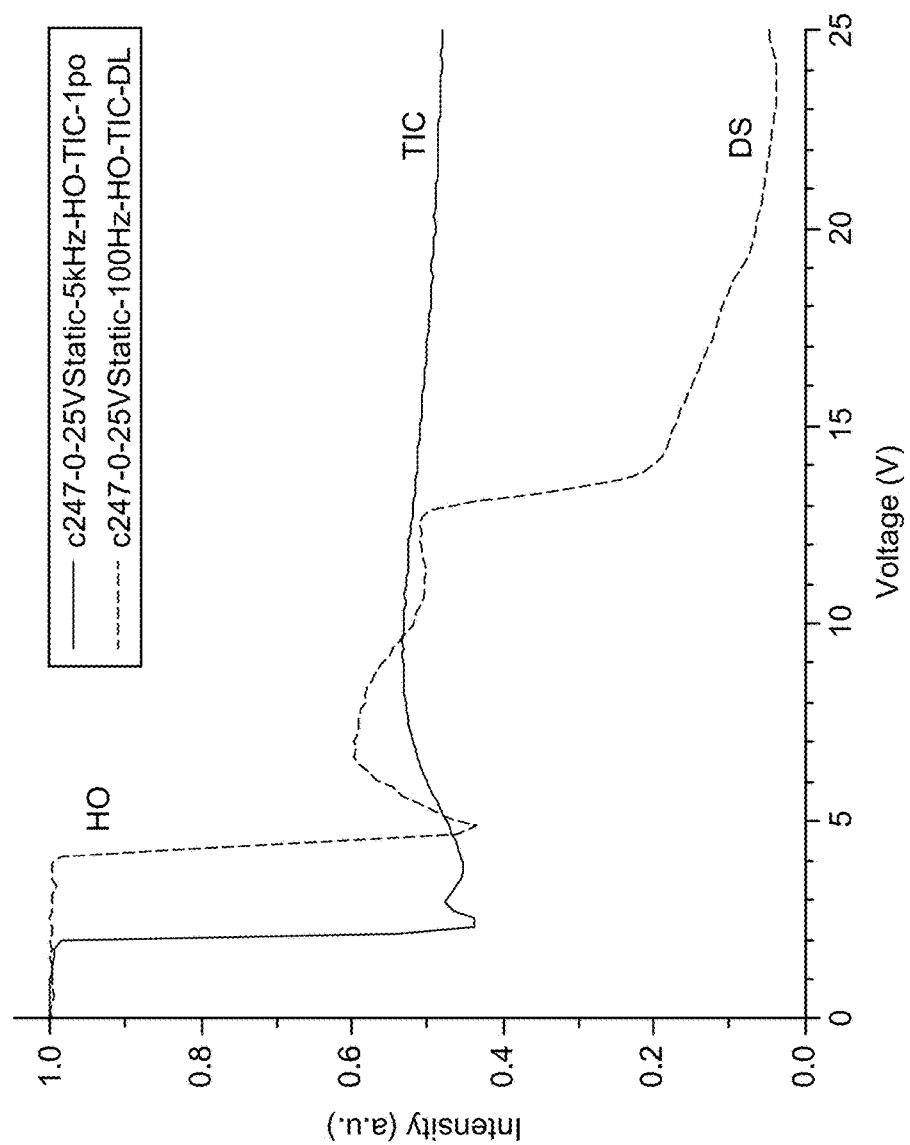
FIG. 15A is a graph showing light transmittance versus applied voltage of a dichroic dye doped SLM device in accordance with the concepts of the present invention.
Figure 15B:
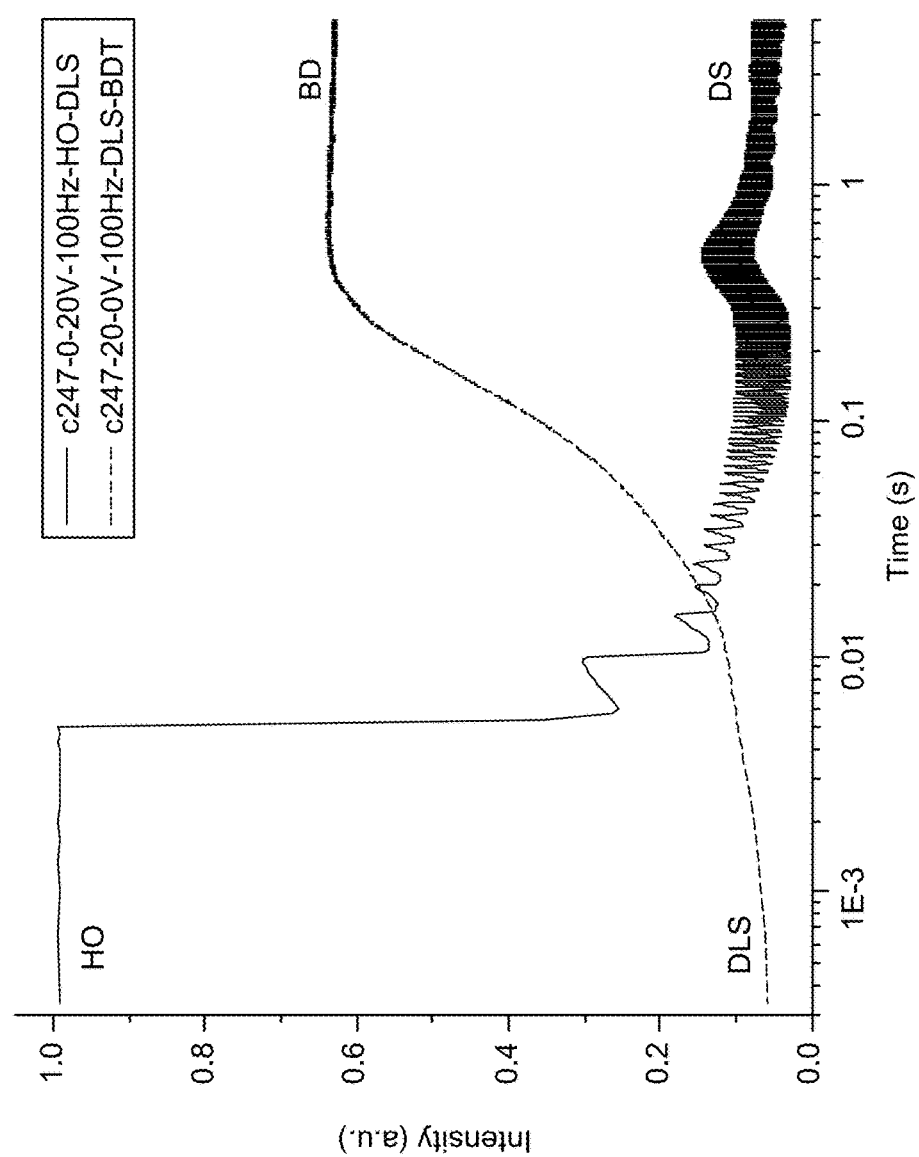
FIG. 15B is a graph showing light transmittance versus switching times of a dichroic dye doped SLM device in accordance with the concepts of the present invention.
Figure 16A:
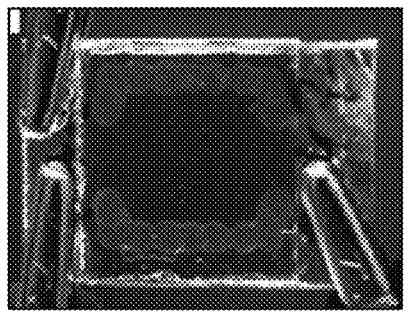
FIGS. 16A-H are schematic views of the dye-doped SLM device of the present invention when switched to different textures from the initial homeotropic texture in response to an applied electric field, whereby
Figure 16B:
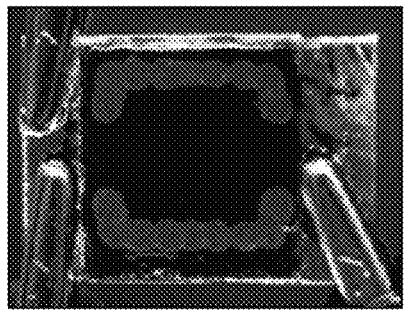
Figure 16C:
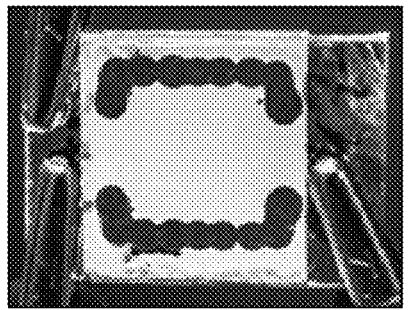
Figure 16D:
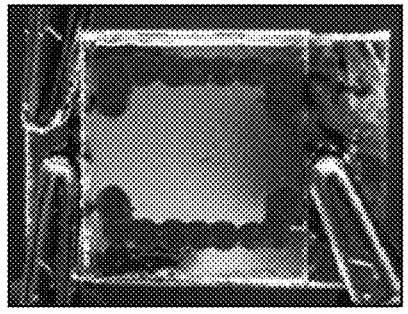
Figure 16E:
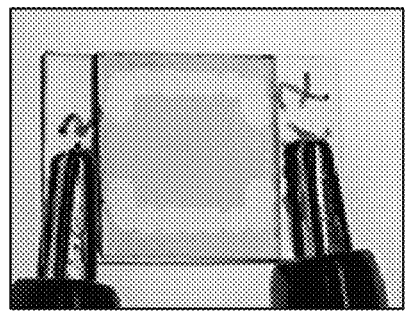
Figure 16F:
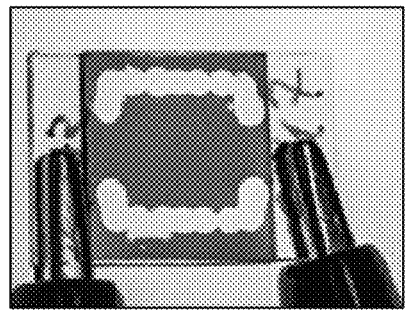
Figure 16G:
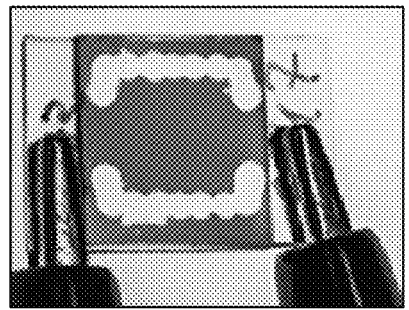
Figure 16H:
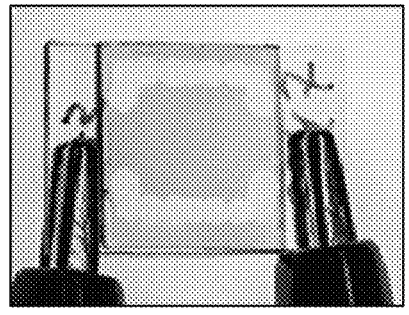

A black dichroic dye S-344 (Mitsui Totsu Chemical, Japan) absorbs the electric E-field of light along the long axis of the dye molecules, while it transmits light in the direction perpendicular to the long axis of the dye molecule. An SLM device of the present invention is prepared with a cholesteric mixture (similar to that of Example 1 discussed above) doped with about 1.15 wt. % of S-344 dye. FIG. 15A shows the light transmittance versus applied voltage and transmittance versus time of the SLM device switching from the HO to the BD or the FP texture. Depending on the frequency of the applied voltage, as shown in FIG. 14a, the light transmittance state (HO texture) of the dye-doped SLM device can be dimmed by applying an electric field to the translationally-invariant configuration (TIC) in the case when a high-frequency (5 kHz) voltage is applied or active dynamic light-scattering (DS) state in the case when a low-frequency (100 Hz) voltage is applied. The HO texture is obtained after the high-frequency voltage is removed and the BD texture is obtained after the low-frequency voltage is removed. The TIC and the DS states require voltage to be applied, while the BD and the HO textures are stable at zero voltage. FIG. 15B shows the light transmittance versus time for switching between two bistable states of the dye-doped SLM device: the transparent HO and scattering BD states. The response time for switching from the HO state to the DS state is about 100 milliseconds, and the response time for switching from the DS texture to the BD texture is about 500 milliseconds.

FIG. 16a-h shows the dye-doped SLM device 10 switched to a different texture from the initial homeotropic texture in response to an applied electric field. In case of dye-doped SLM device 10, the light modulation shows distinct contrast between the light transmitted, absorbed or scattered states.

Thus, the bistable spatial light-modulating (SLM) device 10 of the present invention is based on a bubble domain texture of a cholesteric liquid crystal that is confined into an optical cell with homeotropic alignment, whereby the device is sensitive to external force stimulation, including electric, light and mechanical pressure or force fields. The bistable SLM device 10 responds to an applied voltage pulse by switching from the transparent (homeotropic) state to the light-scattering (bubble domain texture) state with a low-frequency voltage pulse. The SLM device 10 is switched back to the transparent state in response to a high-frequency voltage pulse or pressure with a switching speed in the range of about hundred milliseconds to second. The measured pressure sensitivity threshold with rigid substrates can be shortened with thin glass or flexible substrates. The SLM device 10 that modulates one of the optical properties (amplitude, phase or polarization) of an optical wavefront that may be either electrical, optical or pressure sensitive and is useful for a wide range of applications including smart windows, switchable gratings, light extracting devices, touch sensors, detectors and displays.

Therefore, one advantage of the present invention is that a bistable spatial light-modulating (SLM) device is able to change optical states in response to various external stimulation, including but not limited to, electric fields, light irradiation, and mechanical/physical pressure or force fields. Another advantage of the present invention is that the bistable spatial light-modulating (SLM) device is able to be switched into various optical states, whereupon the selected optical state remains stable when an electric field is no longer being applied thereto. Yet another advantage of the present invention is that the bistable spatial light-modulating (SLM) device is capable of modulating both visible and near infrared light, and is suitable for various applications, including but not limited to smart windows, active optical component, displays, electronic paper and sensors, for example.

Thus, it can be seen that the objects of the present invention have been satisfied by the structure and its method for use presented above. While in accordance with the Patent Statutes, only the best mode and preferred embodiments have been presented and described in detail, with it being understood that the present invention is not limited thereto or thereby. Accordingly, for an appreciation of the true scope and breadth of the invention, reference should be made to the following claims.

What is claimed is:

1. A spatial light modulation device comprising:
a first at least partially light transparent layer;
a first alignment layer disposed on said first at least partially light transparent layer;
a second at least partially light transparent layer;
a second alignment layer disposed on said second at least partially light transparent layer;
a mixture that includes nematic liquid crystal material and a chiral dopant, wherein said mixture is disposed in a gap formed between said first and second alignment layers, such that said first and second alignment layers align said liquid crystal material in a first stable state;
wherein said mixture is configured, in response to a stimulus, to selectively switch between said first stable state and a different stable state that includes one of a bubble domain (BD) state, a dynamic light scattering (DS) state, or a finger print (FP) state, wherein said first stable state and said different stable state remain stable after the stimulus is removed.

2. A spatial light modulation device comprising:
a first conductive, at least partially light transparent electrode;
a first homeotropic alignment layer disposed on said first conductive, at least partially light transparent electrode;
a second conductive, at least partially light transparent electrode, wherein said first and second electrodes are adapted to be coupled to a voltage source;
a second homeotropic alignment layer disposed on said second conductive, at least partially light transparent electrode; and
a mixture that includes nematic liquid crystal material and a chiral dopant, wherein said mixture is disposed in a gap formed between said first and second alignment layers, such that said first and second alignment layers homeotropically align the liquid crystal material in a stable homeotropic state;
wherein, based on the voltage applied, said liquid crystal material changes from said stable homeotropic state to one of a bubble domain (BD) state, a dynamic light scattering (DS) state, or a finger print (FP) state, which is stable after the voltage is removed from the electrodes.

3. The device of claim 1, wherein one or more of said first or second conductive, at least partially light transparent electrodes is formed of indium-tin-oxide (ITO).

4. The device of claim 1, wherein said first and second alignment layers are formed of polyimide.

5. The device of claim 1, wherein said mixture further includes a light-absorbing moiety.

6. The device of claim 1, wherein said mixture further includes a polymeric material.

7. The device of claim 1, wherein said first and second electrodes are flexible.

8. The device of claim 1, wherein the stimulus is one of an electric field, a deformation force, or light.

9. The device of claim 1, wherein said first stable state comprises a homeotropic state.

10. The device of claim 1, wherein said mixture is capable of modulating visible and near-infrared light passing therethrough.

* * * * *